United States Patent
Stav et al.

(10) Patent No.: US 11,708,692 B2
(45) Date of Patent: *Jul. 25, 2023

(54) CEMENTITIOUS PANELS WITH SWELLABLE MATERIALS AND METHODS OF PROVIDING A MOISTURE OR WATER BARRIER IN CEMENTITIOUS PANELS USING SWELLABLE MATERIALS

(71) Applicant: National Gypsum Properties, LLC, Charlotte, NC (US)

(72) Inventors: Eli Stav, Charlotte, NC (US); Joseph J. Bailey, Charlotte, NC (US); Bradley G. Busche, Shelby, NC (US); Brian G. Randall, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,991

(22) Filed: Dec. 27, 2019

(65) Prior Publication Data
US 2020/0208398 A1 Jul. 2, 2020

Related U.S. Application Data

(60) Provisional application No. 62/785,383, filed on Dec. 27, 2018.

(51) Int. Cl.
*E04B 1/68* (2006.01)
*E04C 2/04* (2006.01)
(Continued)

(52) U.S. Cl.
CPC ............ *E04B 1/6815* (2013.01); *B32B 3/266* (2013.01); *B32B 5/022* (2013.01); *B32B 5/024* (2013.01);
(Continued)

(58) Field of Classification Search
CPC ......... B32B 13/02; B32B 13/04; B32B 13/08; B32B 13/12; B32B 13/14; B32B 2255/02; B32B 2255/10; B32B 2255/12; B32B 2255/20; B32B 2255/26; B32B 2262/101; B32B 2262/103; B32B 2264/0228; B32B 2264/025; B32B 2264/0264; B32B 2264/062; B32B 2264/10; B32B 2264/102; B32B 2264/104; B32B 2264/105; B32B 2307/3065; B32B 2307/724; B32B 2307/726; B32B 2307/7265; B32B 2307/762; B32B 2607/00; B32B 27/08; B32B 27/10; B32B 27/12; B32B 29/005; B32B 29/02; B32B 3/266; B32B 5/022;
(Continued)

(56) References Cited

U.S. PATENT DOCUMENTS

| | | |
|---|---|---|
| 2,560,521 A | 7/1951 | Camp |
| 2,776,234 A | 1/1957 | Riddell et al. |

(Continued)

*Primary Examiner* — David Sample
*Assistant Examiner* — Donald M Flores, Jr.
(74) *Attorney, Agent, or Firm* — Dority & Manning, P.A.

(57) ABSTRACT

Provided are cementitious panel that include a swellable material within a core layer, a dense layer, and/or a sheet of facing material that make up a cementitious panel, as well as methods of manufacturing such cementitious panels that include a swellable material and methods of providing a moisture or water barrier in a cementitious panel.

22 Claims, 6 Drawing Sheets

(51) Int. Cl.
*E04C 2/52* (2006.01)
*B32B 13/04* (2006.01)
*B32B 3/26* (2006.01)
*B32B 5/02* (2006.01)
*B32B 27/10* (2006.01)
*B32B 13/14* (2006.01)
*B32B 13/08* (2006.01)
*B32B 13/12* (2006.01)
*B32B 27/08* (2006.01)
*E04C 2/26* (2006.01)
*C04B 7/00* (2006.01)
*C04B 7/12* (2006.01)
*C04B 7/02* (2006.01)
*B32B 13/02* (2006.01)

(52) U.S. Cl.
CPC .............. *B32B 13/04* (2013.01); *B32B 13/08* (2013.01); *B32B 13/12* (2013.01); *B32B 13/14* (2013.01); *B32B 27/08* (2013.01); *B32B 27/10* (2013.01); *E04C 2/043* (2013.01); *E04C 2/526* (2013.01); *B32B 13/02* (2013.01); *B32B 2255/12* (2013.01); *B32B 2262/101* (2013.01); *B32B 2264/025* (2013.01); *B32B 2264/0228* (2013.01); *B32B 2264/062* (2013.01); *B32B 2264/10* (2013.01); *B32B 2264/102* (2013.01); *B32B 2264/104* (2013.01); *B32B 2264/105* (2013.01); *B32B 2307/724* (2013.01); *B32B 2307/726* (2013.01); *B32B 2307/7265* (2013.01); *B32B 2607/00* (2013.01); *C04B 7/00* (2013.01); *C04B 7/02* (2013.01); *C04B 7/12* (2013.01); *E04B 2001/6818* (2013.01); *E04C 2/26* (2013.01); *Y10T 428/24* (2015.01)

(58) Field of Classification Search
CPC .. B32B 5/024; B32B 5/26; B32B 7/12; C04B 7/00; C04B 7/02; C04B 7/12; E04B 1/6815; E04B 2001/6818; E04C 2/043; E04C 2/26; E04C 2/526; Y10T 428/24
See application file for complete search history.

(56) References Cited

U.S. PATENT DOCUMENTS

| | | | | |
|---|---|---|---|---|
| 4,070,839 A * | 1/1978 | Clem | ......................... | E04B 1/66 428/117 |
| 4,136,250 A * | 1/1979 | Mueller | ............... | C08F 290/068 528/29 |
| 5,027,572 A | 7/1991 | Purcell et al. | | |
| 5,220,762 A * | 6/1993 | Lehnert | ................... | B32B 13/14 264/133 |
| 5,397,631 A | 3/1995 | Green et al. | | |
| 5,552,187 A | 9/1996 | Green et al. | | |
| 6,054,205 A * | 4/2000 | Newman | ............ | B28B 19/0092 428/221 |
| 6,233,890 B1 | 5/2001 | Tonyan | | |
| 6,258,890 B1 | 7/2001 | Schmidt-Thuemmes et al. | | |
| 6,358,580 B1 * | 3/2002 | Mang | ...................... | C08L 25/10 428/36.1 |
| 6,746,781 B2 | 6/2004 | Francis et al. | | |
| 6,808,772 B2 | 10/2004 | Kunzel et al. | | |
| 6,901,712 B2 | 6/2005 | Lionel | | |
| 7,049,251 B2 | 5/2006 | Porter | | |
| 7,148,160 B2 | 12/2006 | Porter | | |
| 7,300,515 B2 | 11/2007 | Porter | | |
| 7,300,892 B2 | 11/2007 | Porter | | |
| 7,442,659 B2 | 10/2008 | Moll | | |
| 7,553,780 B2 | 6/2009 | Smith | | |
| 7,662,221 B2 | 2/2010 | Fay | | |
| 7,749,928 B2 | 7/2010 | Smith et al. | | |
| 7,829,197 B2 | 11/2010 | Chen et al. | | |
| 7,833,916 B2 | 11/2010 | Leeser et al. | | |
| 8,215,083 B2 | 7/2012 | Toas et al. | | |
| 8,277,915 B2 | 10/2012 | Couturier | | |
| 2003/0215609 A1 | 11/2003 | Burkart | | |
| 2004/0137813 A1 | 7/2004 | Faucher | | |
| 2005/0159057 A1 | 7/2005 | Hauber et al. | | |
| 2008/0108524 A1 * | 5/2008 | Willberg | ................. | C09K 8/035 507/225 |
| 2009/0208714 A1 | 8/2009 | Currier et al. | | |
| 2010/0143682 A1 * | 6/2010 | Shake | ..................... | B32B 5/024 428/218 |
| 2011/0042613 A1 * | 2/2011 | Loehner | ................... | C08L 33/24 252/194 |
| 2012/0302698 A1 | 11/2012 | Dorn et al. | | |
| 2014/0272404 A1 | 9/2014 | Shake et al. | | |
| 2014/0302280 A1 | 10/2014 | Gautam et al. | | |
| 2015/0064433 A1 | 3/2015 | Foster et al. | | |
| 2015/0064488 A1 | 3/2015 | Foster et al. | | |
| 2015/0104629 A1 * | 4/2015 | Cao | ......................... | E04C 2/043 428/220 |
| 2015/0144029 A1 * | 5/2015 | Yin | ..................... | C04B 40/0039 106/803 |
| 2015/0175792 A1 | 6/2015 | Chou et al. | | |
| 2015/0240492 A1 | 8/2015 | Teng et al. | | |
| 2016/0222646 A1 | 8/2016 | Thomas et al. | | |
| 2016/0222647 A1 | 8/2016 | Thomas et al. | | |
| 2016/0222656 A1 | 8/2016 | Teng et al. | | |
| 2016/0281352 A1 | 9/2016 | Bennett et al. | | |
| 2016/0289954 A1 | 10/2016 | Thomas et al. | | |
| 2016/0289966 A1 | 10/2016 | Thomas et al. | | |
| 2017/0044406 A1 | 2/2017 | Hubbard et al. | | |
| 2018/0119417 A1 * | 5/2018 | Li | ........................... | C04B 28/14 |
| 2019/0071837 A1 * | 3/2019 | Krasnoff | ................. | C04B 20/008 |
| 2020/0207060 A1 * | 7/2020 | Busche | ..................... | B32B 3/26 |

\* cited by examiner

CEMENTITIOUS PANELS WITH SWELLABLE MATERIALS AND METHODS OF PROVIDING A MOISTURE OR WATER BARRIER IN CEMENTITIOUS PANELS USING SWELLABLE MATERIALS

CROSS-REFERENCE TO RELATED APPLICATION

The present application claims filing benefit of U.S. Provisional Patent Application Ser. No. 62/785,383 having a filing date of Dec. 27, 2018, and which is incorporated herein by reference in its entirety.

BACKGROUND

Water penetration into and through cementitious panels is an area of major concern in the building and construction industry. Cementitious panels are generally formed of a cementitious core material that contains a hydraulically setting material such as gypsum, cement, or the like. The cementitious core material is typically sandwiched between sheets of facing material such as paper or paperboard, or woven or non-woven fibers or filaments. Bulk water or moisture that penetrates through the facing material can promote the growth of organisms, such as mold and mildew, which can lead to various health conditions. Additionally, water or moisture can deteriorate the cementitious panels. For example, the composition of the panels may become dissolved in the wet environment, the cementitious core material may crack due to freeze-thaw cycles, and/or the facing material may separate from the cementitious core material. The facing material of a cementitious panel may be coated with a moisture barrier; however, such coatings have a limited range of properties and performance capabilities.

It would be desirable to provide cementitious panels that contain polymeric materials for improved moisture or water barrier properties; however, previous efforts of adding polymeric materials to cementitious panels of a nature and quantity suitable for improving moisture or water barrier properties have proved unsuitable for traditional production processes used to form the cementitious panels. For example, previous efforts to introduce polymeric materials tended to inhibit evacuation of moisture from the core of the cementitious panel, interfering with the curing process of the cementitious material in the panel and removal of excess moisture from the panel during kiln drying.

As a result, there remains a need for improved cementitious panels that have improved moisture barrier properties and other performance capabilities.

SUMMARY OF THE INVENTION

Aspects and advantages will be set forth in part in the following description, or may be obvious from the description, or may be learned through practicing the presently disclosed subject matter.

In one aspect, the present disclosure embraces cementitious panels. An exemplary cementitious panel may include a core layer that contains a cementitious material, a plurality of sheets of facing material surrounding the core layer, and, optionally, one or more dense layers. The plurality of sheets of facing material may include a first sheet of facing material and a second sheet of facing material. The one or more dense layers may include a first dense layer that contains a cementitious material defining an interface between the core layer and the first sheet of facing material. The one or more dense layers may additionally or alternatively include a second dense layer that contains a cementitious material defining an interface between the core layer and the second sheet of facing material. The exemplary cementitious panel may include one or more swellable materials. In various embodiments, the core layer, the first dense layer, the second dense layer, the first sheet of facing material, and/or the second sheet of facing material may include at least one of the one or more swellable materials.

In another aspect, the present disclosure embraces methods of manufacturing a cementitious panel. In one embodiment, an exemplary method may include conveying a plurality of sheets of facing material and a slurry of cementitious core material that contains a swellable material, forming a continuous length of cementitious panel material that includes the slurry of cementitious core material surrounded by the plurality of sheets of facing material, and cutting the continuous length of cementitious panel material laterally to a desired length, providing a cementitious panel. In another embodiment, an exemplary method may include conveying a slurry of cementitious core material and a plurality of sheets of facing material, with at least one of the plurality of sheets of facing material including a swellable material, forming a continuous length of cementitious panel material that includes the slurry of cementitious core material surrounded by the plurality of sheets of facing material, and cutting the continuous length of cementitious panel material laterally to a desired length, providing a cementitious panel.

In yet another aspect, the present disclosure embraces methods of providing a moisture or water barrier in a cementitious panel. An exemplary method may include contacting a swellable material in a cementitious panel with a first quantity of moisture or water, absorbing with the swellable material at least some of the first quantity of moisture or water with the swellable material swelling to at least twice the non-swollen volume of the swellable material, at least partially blocking a void volume in the cementitious panel with the swellable material swollen from having absorbed at least some of the first quantity of water, and preventing or mitigating a second quantity of moisture of water from penetrating through the void volume at least partially blocked by the swollen swellable material.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1A:
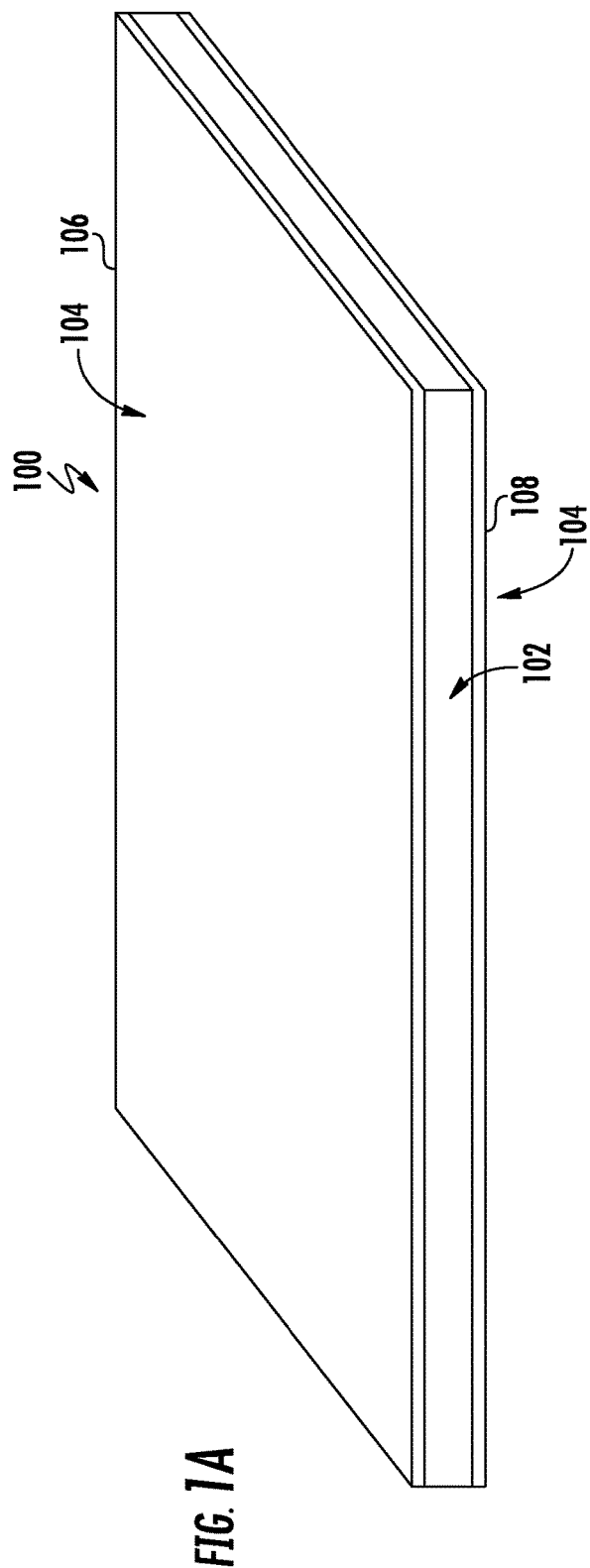
FIG. 1A schematically shows a perspective view of an exemplary cementitious panel.

Repeat use of reference characters in the present specification and drawings is intended to represent the same or analogous features or elements of the present disclosure.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides cementitious panels that include swellable materials and methods of manufacturing cementitious panels that include a swellable material. The swellable materials may generally impart desired moisture barrier properties to cementitious panels while maintaining breathability. In some embodiments, swellable materials may be capable of providing a barrier to moisture that activates upon the swellable material being initially exposed to moisture or water. When an initial exposure of moisture or water contacts the swellable material, some of the moisture or water may be absorbed by the swellable material. As the swellable material absorbs the moisture or water, the material swells and thereby prevents or mitigates further moisture or water penetration. The swellable material may prevent or mitigate moisture or water from penetrating deeper into the cementitious panel and/or to other regions of the panel beyond a localized region where the swellable material has swollen from having absorbed moisture or water. Swellable materials may be effective to prevent or mitigate moisture or water penetration through pores or void volumes in a cementitious panel. Additionally, or in the alternative, swellable material may be effective to prevent or mitigate moisture or water penetration through punctures, cracks, cuts, perforations, or the like, which may arise from damage to a cementitious panel as well as from ordinary installation, use, or wear of the cementitious panel.

Swellable material may be included in any portion of a cementitious panel. For example, swellable material may be included within the core of a cementitious panel and/or within the facing material that surrounds the core. In some embodiments, a cementitious panel may include what is commonly referred to as a dense layer, which describes a layer or region of the core material that generally defines an interface between the core layer and the facing material. The dense layer generally includes a cementitious material that has a similar composition to that of the central region of the core, but with a greater concentration of gypsum crystals and a lower concentration of void volumes such as those caused by foam when forming the panel. This greater concentration of gypsum crystals and lower concentration of void volumes corresponds to a higher density than that of the central region of the core. In some embodiments, a swellable material may be included in the dense layer. The dense layer may sometimes be a particularly suitable location for swellable materials. When included in the dense layer, swellable material may prevent or mitigate excessive water or moisture from penetrating past the facing material or the dense layer. Similarly, when included in a facing material, swellable material may prevent or mitigate excessive water or moisture from penetrating past the facing material. When included in the core layer, swellable material may prevent or mitigate excessive water or moisture from penetrating deeper into the core layer. Additionally, whether located in the facing material, the dense layer, or the core layer, swellable material may prevent or mitigate water or moisture from penetrating laterally through the cementitious panel.

Swellable material may enhance the water impermeability of the facing material, for example, by initially absorbing some water, causing the swellable material to swell and at least partially block void volumes within the facing material. For example, in some embodiments a facing material may include a polymeric film that has a network of interconnected pores. The swellable material may at least partially block the network of interconnected pores when swollen upon initial exposure to water or moisture. In this way, the water-swellable properties of swellable materials may generally prevent or mitigate water or moisture from penetrating beyond a region where the swellable materials are located. For example, in one embodiment, when located in the facing material and/or the dense layer, the swellable material may prevent or mitigate water or moisture from penetrating past the facing material and into the core layer.

Facing materials typically are configured to provide a certain degree of breathability. In some embodiments, a facing material may be substantially impervious to liquid water yet "breathable" in the sense of being pervious to water vapor and gases. For example, a facing material may include pores in that allow air or moisture to migrate into and out of the cementitious panel, while generally preventing bulk water from penetrating into the panel. However, it will be appreciated that in other embodiments, facing material may be "non-breathable" in the sense of being substantially impervious to water vapor and gases. Such pores may provide desirable breathability, but may also undesirably allow excessive moisture or water penetration which may damage the cementitious panel, particularly under excessively wet or humid conditions.

In some embodiments, the water-swellable properties of the swellable materials may be reversible. Swellable materials may provide a variable degree of breathability which may mitigate or prevent moisture or water penetration under such excessively wet or humid conditions. That is, when in contact with water or moisture the swellable material may swell as water or moisture is absorbed, and then the swellable material may contract as absorbed water or moisture desorbs or dissipates. The water or moisture may desorb or dissipate when the swellable material is no longer in contact with water or moisture, or under conditions exhibiting a lesser degree of moisture of water exposure than the previous conditions when the swellable material absorbed the water or moisture. Under dry or sufficiently lower humidity conditions, void volumes in the cementitious panel (e.g., pores or other void volumes in the facing material, dense layer, and/or core layer) may allow the cementitious panel to exhibit a certain degree of breathability. When the cementitious panel becomes exposed to water, moisture, or higher humidity, swellable material in the cementitious panel may absorb moisture and swell, thereby at least partially restricting regions of the void volumes where the swellable material has swollen. The swellable material may thereby prevent or mitigate further moisture or water from penetration through the void volumes. The degree of swelling and corresponding restriction of void volumes may vary depending on the extent of moisture or water exposure. When moisture or water exposure is low, the swellable material may be in an unswollen state, and the void volumes may allow for a maximum level of breathability. As moisture or water exposure increases in duration and/or intensity, the swellable material may increasingly swell and thereby increasingly restrict the pores corresponding to the increasing moisture or water exposure. As the moisture or water exposure subsides, the swellable material may release previously-absorbed moisture, thereby reopening the pores and allowing breathability to increase.

While a facing material may provide a barrier to moisture or water penetration to a certain extent, the continuity of the facing material may become interrupted by punctures, cracks, cuts, perforations, or the like. One particular interruption to the continuity of facing materials are fastener holes, which include holes, punctures, cracks, cuts, perforations, or the like caused by fasteners such as nails or screws used to hang cementitious panels in place. Swellable materials included in any one or more portions of a cementitious panel may prevent or mitigate moisture or water penetration through such fastener holes. Similarly, swellable materials may prevent or mitigate moisture or water penetration through other types of punctures, cracks, cuts, perforations, or the like that may exist in a cementitious panel due to damage as well as from ordinary installation, use, or wear. Swellable material located in the facing material may prevent or mitigate moisture of water penetration beyond the facing material, such as through pores and/or interruptions in the continuity of the facing material. Whether located in the facing material, the dense layer, and/or the core, swellable material may prevent or mitigate moisture or water penetration beyond a localized area where the swellable material has swollen upon having absorbed moisture or water.

The presently disclosed swellable materials may further be coated or encapsulated to protect the swellable materials during hydration of the cementitious material, to reduce or prevent expansion during hydration that might negatively affect properties of the cementitious panel, and/or to ensure that these materials maintain effectiveness at the time most needed (i.e. during penetration by fasteners to prevent water infiltration after installation, after long-term exposure, and/or if the panel cracks). Ideally, the swellable materials will not expand during production of the cementitious panels so as to not disrupt the integrity of the interface between the cementitious core and the facing material and/or so as to not reduce the integrity of the core.

The coating material for the swellable materials may dissolve in water over time but remain intact during board hydration and board drying in the kiln. Alternatively, the coating or encapsulating material may protect the swellable material to prevent swelling during board hydration but slowly dissolve or melt in water at the elevated temperatures, such as at a temperature where the core of the board approaches the boiling point of water during drying in the kiln. An example of such an encapsulating material includes a fully hydrolyzed polyvinyl alcohol. Further, the coating may be formed of materials that are stable through board production but that rupture or break upon being punctured by a fastener or upon sustaining other damage or stress.

In some embodiments, after exposure and conditioning during production of the cementitious panels, the encapsulating material would, optionally, no longer fully protect the swellable material. The swellable material would then be available to expand during water exposure after application in the field. Alternatively, the encapsulating material could remain covering the swellable material and dissolve or rupture after application in the field.

A cementitious panel that contains a swellable material may exhibit "self-healing" properties, such that upon sustaining initial damage of a physical or water-related nature, the swellable material may become activated by a resulting exposure to moisture or water which may cause the swellable material to swell and thereby prevent or reduce the tendency for such moisture or water to penetrate further into the cementitious panel and further damage or deteriorate the panel. For example, when a cementitious panel is punctured by a fastener or sustains other types of damage such as cracks, cuts, perforations, or the like, the swellable material in the panel may be exposed, and when coming into contact with water or moisture, the exposed swellable material may absorb the water or moisture and thereby expand so as to at least partially block or fill void volumes in the cementitious panel. Additionally, or in the alternative, excessive exposure to moisture or water may eventually lead to moisture penetrating though the facing material of the panel and into void volumes within the core. Regardless of the cause, moisture or water penetrating the facing material and/or entering such void volumes may interact with and become absorbed by the swellable material, causing the swellable material to swell and thereby prevent or reduce such moisture or water from penetrating further into the cementitious panel. In this way, the swellable material may provide some protection where punctures or other damage might otherwise allow moisture or water to deteriorate or weaken a cementitious panel.

Any of the presently disclosed swellable materials may be utilized to provide cementitious panels with such "self-healing" properties, including coated or encapsulated swellable materials as well as inorganic or organic swellable materials that do not have a coating or encapsulation layer. In the case of coated or encapsulated swellable materials, the "self-healing" properties of the swellable material may become activated by physical damage such as a puncture or crack rupturing the coating or encapsulation layer and thereby exposing the swellable material. Additionally, or in the alternative, the "self-healing" properties may become activated by exposure to a sufficiently high level of moisture or water such that the coating or encapsulation layer dissolves. In this way, a desirable level of moisture may be allowed to pass through the various layers of the cementitious panel, such as to allow the panel to exhibit good breathability, without activating the "self-healing" properties of the swellable material unless or until the coating or encapsulation layer ruptures or dissolves. A balance between good breathability and "self-healing" properties may be achieved by carefully controlling the composition of the swellable material and the coating or encapsulation layer thereof, as well as by carefully controlling the location and concentration of the swellable material within the various layers of the cementitious panel.

In some embodiments, a swellable material contained within a coating or encapsulation layer may include a swellable material in the form of a fluid or a swellable material dispersed in a fluid. For example, an organic swellable material such as a swellable polymer or a super-absorbent polymer in the form of a fluid may be contained within a coating or encapsulation layer. As another example, such an organic swellable material and/or an inorganic swellable material such as a swellable clay may be dispersed in a fluid which may be contained within a coating or encapsulation layer. When a coating or encapsulation layer ruptures or dissolves, such a fluid (i.e., a swellable material in the form of a fluid or dispersed in a fluid) may flow to other areas where the swellable material may then swell and thereby prevent or reduce the tendency for such moisture or water to penetrate further into the cementitious panel and further damage or deteriorate the panel.

A swellable material in the form of a fluid or dispersed in a fluid may flow by way of capillary action and/or diffusion. In some embodiments, a swellable material may flow through void volumes, punctures, cracks, cuts, perforations, or the like by way of capillary action. In this way, the swellable material may flow into other areas of such a puncture, crack, cut, perforation, or the like so as to provide "self-healing" properties at locations beyond the original location of the coated or encapsulated swellable material. Such flowability of a swellable material combined with its swelling capacity may allow a swellable material to encompass a large area of damage, regardless of the location within the area of damage where the coated or encapsulated swellable material may have been initially located. Additionally, or in the alternative, a swellable material in the form of a fluid or dispersed in a fluid may flow through water or moisture by way of diffusion. In some embodiments, such flowability of a swellable material may allow a swellable material to flow through water or moisture by way of diffusion to areas where the swellable material is needed most, regardless of the particular location within the area of damage where the coated or encapsulated swellable material may have been initially located.

In the case of swellable materials that do not have a coating or encapsulation layer, "self-healing" properties may be provided by selectively locating swellable material having suitable moisture absorption properties within various layers of the cementitious panel, such that the swellable material may become activated by exposure to a sufficiently high level of moisture or water and thereby prevent or reduce further penetration into the cementitious panel, while still allowing for good breathability. For example, in some embodiments the swellable material may be located within layers of the panel that typically do not become exposed to sufficiently high levels of moisture or water except when the panel has sustained some initial physical or water-related damage. Additionally, or in the alternative, swellable material located within the core layer of a cementitious panel may be present in the form of a film (e.g., a porous film) upon void volume surfaces, and as such, the swellable material may incrementally fill or block such void volumes (and/or such pores) with increasing exposure to moisture or water. In this way, the breathability of the panel may be retained even with some initial swelling partially blocking the void volumes (and/or pores), while at the same time the swellable material may prevent or mitigate higher levels of moisture from crossing such film and migrating to other portions of the panel.

The cementitious panels presently disclosed include construction materials commonly referred to as wallboard, drywall, gypsum board, cement board, backer board, fiber cement siding, roof board, and the like. These materials may be used for interior or exterior construction. Interior uses include finishing interior walls and ceilings and providing backing material for flooring such as tile, stone and the like. Exterior uses include exterior siding and roofing and providing backing material for other exterior siding or roofing materials such as stucco, masonry, shingles, and the like. Additionally, cementitious panels may provide fire resistance and sound control. Cementitious panels may be formed with any desired dimensions. Standard dimensions for wallboard applications typically call for panels that are about 4-foot wide and about 8-feet to 16-feet long, with thicknesses of about ¼-inch to 2-inches. Of course, cementitious panels may also be manufactured according to other standard or non-standard dimensions.

The presently disclosed cementitious panels containing swellable material may exhibit improved resistance to moisture or water, which may correspond to improved useful life of the panels, particularly in moist or wet environments. The swellable materials may reduce the tendency for moisture or water to penetrate into the core of the cementitious panels. Excessive exposure to moisture or water may lead to a host of problems, including dissolution of core material or other portions of the panel and cracking from freeze-thaw cycles. Such issues may be prevented or mitigated by the swellable material at least partly blocking void volumes in the cementitious panel. Additionally, the swellable material may reduce the tendency for mold or mildew growth caused by excessive moisture or water penetrating through void volumes in the cementitious panel.

The presently disclosed cementitious panels containing swellable material may exhibit improved fastener holding capabilities. Improved fastener holding capabilities may be provided, for example, by swellable material filling void spaces between a fastener and the cementitious panel. For example, moisture that may pass through such void spaces may interact with and become absorbed by the swellable material, causing the swellable material to swell and at least partially fill the void spaces, thereby providing a tighter fit with the fastener. Such fastener holding capabilities may be measured, for example, using a nail pull resistance test according to ASTM C 473-99 and/or ASTM C1396.

Cementitious panels containing swellable material may exhibit improved strength properties relative to cementitious panels that do not include a swellable material. For example, the swellable materials may exhibit improved ductility and elastic modulus which may translate to improved ductility and elastic modulus of the cementitious panel. The improved strength properties may allow for lighter board weights. In some embodiments, the presently disclosed cementitious panels may be highly flexible, allowing cementitious panels to be installed in curved surfaces such as curved walls and the like.

In some embodiments, the presently disclosed cementitious panels may include materials that provide enhanced fire-resistance capabilities. For example, a cementitious panel may include filler materials, additives, and/or coatings that provide enhanced fire resistance. Swellable materials may include water-swellable and/or heat-swellable (i.e., intumescent) materials that may provide enhanced fire resistance capabilities. When exposed to water and/or heat, as applicable, such swellable materials may close gaps, cracks, pores and the like in a cementitious panel, thereby restricting air flow needed for combustion and/or thermal transmission. In even further embodiments, water from fire suppression sprinklers triggered during a fire may be absorbed by swellable materials in a cementitious panel, thereby restricting air flow needed for combustion. The fire-resistance capabilities of a cementitious panel may be measured in accordance with ASTM E119, UL U305, UL U419, and/or UL U423 test methods, among others.

The presently disclosed cementitious panels may additionally/or alternatively include materials capable of removing volatile organic compounds ("VOCs") from the surrounding area such as an indoor area where the cementitious panels are installed. VOCs include organic chemical compounds whose composition makes it possible for them to evaporate under normal indoor atmospheric conditions of temperature and pressure, and includes any organic compound having an initial boiling point less than or equal to 250° C. measured at a standard atmospheric pressure of 101.3 kPa. Exemplary VOCs include propane, butane, formaldehyde, and toluene. In some embodiments, a cementitious panel may include one or more materials capable of adsorbing VOCs. Additionally, or in the alternative, a cementitious panel may include a coating that contains one or more photocatalytic materials capable of converting VOCs to harmless substances in the presence of UV or other light irradiation.

The presently disclosed cementitious panels may include a polymeric-film facing material, which may provide a surface that is substantially impervious to water/moisture yet breathable to water vapor or gasses. Additionally, such facing material may provide a highly smooth surface finish, including a level 5 drywall finish.

It will be appreciated that the features and advantages of the presently disclosed cementitious panels may be provided individually or in combination. Exemplary embodiments will now be discussed in further detail with reference to the accompanying figures. It is understood that terms "upstream" and "downstream" refer to the relative direction that a material travels with respect to a process. For example, "upstream" refers to the direction from which a material travels, and "downstream" refers to the direction to which the material travels. It is also understood that terms such as "top", "bottom", "outward", "inward", and the like are words of convenience and are not to be construed as limiting terms. As used herein, the terms "first", "second", "third", and "fourth" may be used interchangeably to distinguish one component from another and are not intended to signify importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value or the precision of the methods or machines for constructing or manufacturing the components and/or systems.

Figure 1B:
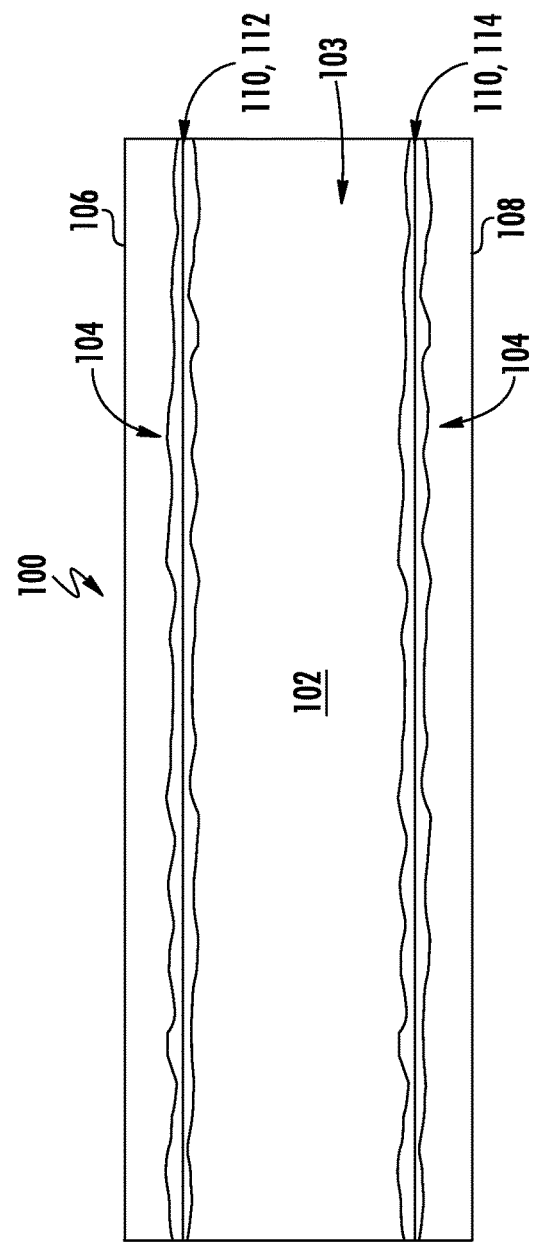
FIG. 1B schematically shows a cross-sectional view of an exemplary cementitious panel.

Now referring to FIGS. 1A and 1B, an exemplary cementitious panel 100 is shown. The cementitious panel 100 includes a core layer 102 that includes a hydraulically setting material such as gypsum, cement, or the like, sandwiched between by a plurality of sheets of facing material 104. As shown, a cementitious panel 100 may include a front sheet 106 and a back sheet 108 of facing material 104.

The core layer 102 of a cementitious panel 100 may include any hydraulically setting material, such as gypsum, synthetic gypsum, various cement types including but not limited to Portland cements (e.g., Portland blast-furnace slag cement or blast furnace cement, Portland-fly ash cement, Portland pozzolan cement, Portland silica fume cement, masonry cements, expansive cements), non-hydraulic cements, pozzolan-lime cements, slag-lime cements, supersulfated cements, calcium sulfoaluminate cements, "natural" cements, geopolymer cements, polymer cements, and blends thereof. The core layer 102 may be formulated by preparing a slurry that includes water, one or more of such hydraulically setting materials, and other additives such as setting accelerants, antidesiccants, waterproofing agents, dispersants, set retarders, surfactants, strength enhancers, polymers, and reinforcing materials such as organic or inorganic aggregates, glass fibers, and the like.

The facing material 104 may include a paper or paperboard material, woven or non-woven fibers or filaments, and/or a polymeric-film. In some embodiments, the facing material 104 may include a polymeric-film. Both the front sheet 106 and/or the back sheet 108 of facing material 104 may include a polymeric-film. In one embodiment, the front sheet 106 of facing material 104 is a polymeric-film. When the front sheet 106 is a polymeric-film, the back sheet 108 may include a paper or paperboard facing material, woven or non-woven fibers or filaments, and/or a polymeric-film facing material. In another embodiment, the back sheet 108 is a polymeric-film. When the back sheet 108 is a polymeric-film, the front sheet 106 may include a paper or paperboard material, woven or non-woven fibers or filaments, and/or a polymeric-film. In yet another embodiment, both the front sheet 106 and the back sheet 108 of facing material 104 are a polymeric-film.

The cementitious panel 100 may include a dense layer 110, which may include a portion of the core layer 102. The portion of the core layer 102 that includes the dense layer 110 surrounds a central core layer 103. The dense layer 110 may be formed by applying a coating of cementitious material to the inner side of the facing material 104. The coating may be applied to the front sheet 106 and/or to the back sheet 108 so as to provide a dense layer at an interface between the core layer 102 and the front sheet 106 and/or between the core layer and the back sheet 108. As shown in FIG. 1B, a cementitious panel may include a front dense layer 112 and a back dense layer 114. The coating that makes up the dense layer 110 typically includes a higher concentration of gypsum crystals and a lower concentration of void volumes relative to the central core layer 103. In some embodiments, some of the gypsum crystals that form in the dense layer 110 may penetrate into the facing material 104, which helps to bind the facing material 104 to the core layer 102. An adhesive or binder may also be included in the core layer 102 and/or in the dense layer 110 to help adhere the facing material 104 to the core layer 102. The adhesive or binder may include starch, dextrin, polyester resin, poly (vinly acetate), poly(ethylene-co-vinyl acetate), polyvinyl alcohol, styrene butadiene, epoxies, acrylics, polyimides, polyurethanes, and so forth.

Typically, cementitious panels 100 commonly referred to as wallboard, drywall, gypsum board, and the like are formed from a cementitious core layer 102 that primarily contains gypsum. Gypsum commonly refers to a mineral composed primarily of calcium sulfate dihydrate, which has the chemical formula $CaSO_4 \cdot 2H_2O$. Gypsum may be obtained from naturally occurring calcium sulfate in anhydrous, dihydrate, or hemihydrate state. Alternatively, gypsum may be obtained synthetically, from industrial scrubbers using a flue-gas desulfurization process. A slurry of gypsum to be used as a core layer 102 for a cementitious panel may be formed by mixing water with powdered anhydrous calcium sulfate ($CaSO_4$) and/or calcium sulfate hemihydrate ($CaSO_4 \cdot \frac{1}{2}H_2O$), commonly referred to as calcined gypsum, stucco, or plaster of Paris. Calcined gypsum is typically prepared by heating pulverized uncalcined gypsum rock in a mill such as a rotary kiln, hammer mill, impact mill, and others or simultaneously heating and pulverizing uncalcined gypsum in a mill to yield stucco predominately including calcium sulfate hemihydrate and to release water vapor. Calcined gypsum (i.e., calcium sulfate hemihydrate) has the desirable property of being chemically reactive with water and will "set" rather quickly when the two are mixed together, yielding calcium sulfate dihydrate.

Typically, cementitious panels 100 commonly referred to as cement board, backer board, fiber cement siding, and the like are formed from a cementitious core layer 102 that primarily contains Portland cement and organic or inorganic aggregate. Portland cement commonly refers to a blend of hydraulically setting materials that primarily includes hydraulic calcium silicates ($3CaO \cdot SiO_2$ and $2CaO \cdot SiO_2$). Additionally, Portland cement may include one or more forms of calcium sulfate, magnesium oxide, aluminum oxide, and iron oxide. Organic aggregate includes cellulose fibers, wood flakes, and the like.

Figure 2:
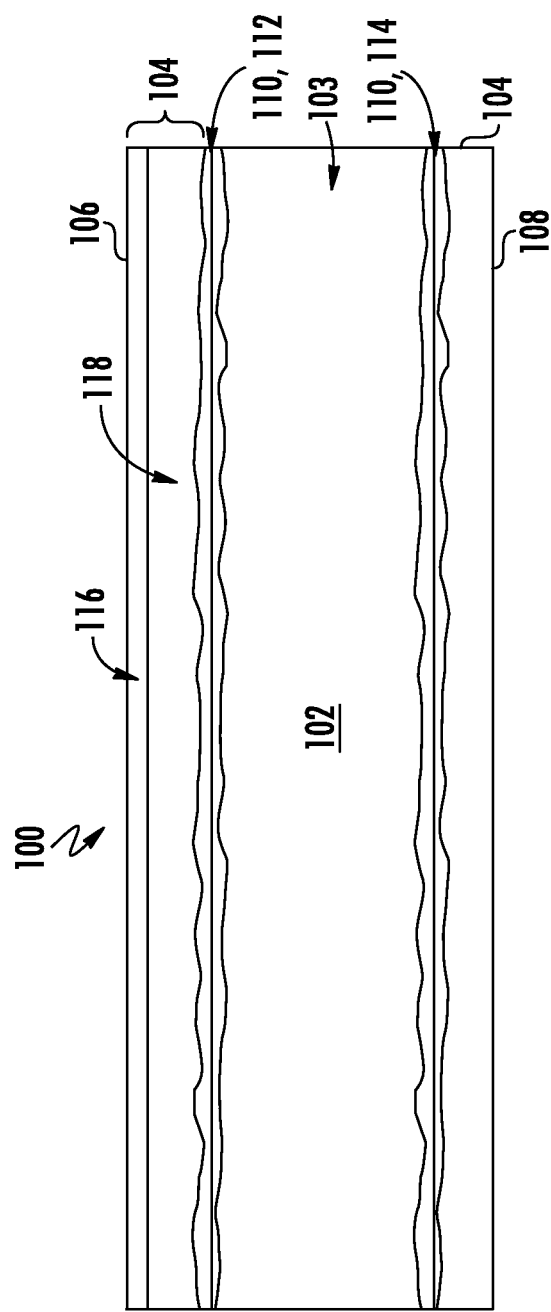
FIG. 2 schematically shows a cross-sectional view of another exemplary cementitious panel.

As shown in FIG. 2, the cementitious panel 100 may include a facing material 104 that has a plurality of layers. It will be appreciated that any number of layers of facing material 104 may be provided. For example, as shown, a cementitious panel may include a front sheet 106 and a back sheet 108 of facing material 104, and the front sheet 106 may include a plurality of layers such as a first layer 116 and a second layer 118. However, it will be appreciated that both front sheet 106 and/or the back sheet 108 of facing material 104 may include a plurality of layers. A swellable material may be provided in any one or more layers of facing material 104. In some embodiments, a swellable material may be provided in the first layer 116 of the facing material, which may be an outer layer of the facing material. A swellable material in the first layer 116 may provide a moisture or water barrier to the cementitious panel.

The plurality of layers may be provided by adhering sheets of facing material to one another, and/or by applying a coating to a sheet of facing material 104. An adhesive or binder may be included to adhere multiple layers of facing material 104 to one another, and/or to adhere the facing material 104 to the core layer 102. The adhesive or binder may be applied separately or may be included within the composition of any of the layers, such as within the composition of the facing material 104 or within the composition of the dense layer 110. The multiple layers of facing material may include any desired type of material, including a polymeric-film facing material, a paper or paperboard material, and/or woven or non-woven fibers or filaments. In some embodiments, one or more of the plurality of layers of facing material 104 may take the form of a coating. For example, a coating may be applied to the first layer 116 of facing material 104 and/or to the second layer 118 of facing material 104. In some embodiments, the first layer 116 of facing material 104 may take the form of a coating applied to the second layer 118 of facing material 104. The coating may be applied to a layer of facing material 104 that takes the form of a polymeric-film material, a paper or paperboard material, and/or woven or non-woven fibers or filaments.

Swellable Materials

Cementitious panels may be provided that include any one or more of a number of different kinds of swellable materials. The term "swellable material" refers to an organic or inorganic material, or a combination of organic and/or inorganic materials, that include at least one component that is "water-swellable." By "water-swellable," it is meant that the particles have a capacity to swell when contacted with moisture or water. The term "organic" refers to a natural or synthetic carbon-based compound or material, and the term "inorganic" refers to any compound or material that is not organic. In accordance with the present disclosure, a swellable material may include one or more organic swellable materials and/or inorganic swellable materials. Exemplary swellable materials include organic swellable materials such as swellable polymers and superabsorbent polymers, inorganic swellable materials such as swellable clays, and combinations thereof. Further exemplary swellable materials include composite swellable materials such as superabsorbent particles, and coated or encapsulated swellable materials.

Exemplary swellable materials may have a swelling capacity of at least twice the non-swollen volume of the swellable material, as determined by volumetric expansion. For example, in some embodiments, a swellable material may have capability to swell to a volume that is from 2 to 100 times the non-swollen volume of the swellable material, such as from 2 to 50 times the non-swollen volume, such as from 2 to 25 times the non-swollen volume, such as from 2 to 5 times the non-swollen volume, such as from 2 to 10 times the non-swollen volume, such as from 5 to 25 times the non-swollen volume, such as from 10 to 30 times the non-swollen volume, such as from 20 to 50 times the non-swollen volume, such as from 40 to 60 times the non-swollen volume, such as from 50 to 80 times the non-swollen volume of the swellable material. A swellable material may swell to a volume that is at least 2 times the non-swollen volume of the swellable material, such as at least 5 times the non-swollen volume, such as at least 5 times the non-swollen volume, such as at least 10 times the non-swollen volume, such as at least 20 times the non-swollen volume, such as at least 30 times the non-swollen volume, such as at least 40 times the non-swollen volume, such as at least 50 times the non-swollen volume, such as at least 60 times the non-swollen volume, such as at least 80 times the non-swollen volume of the swellable material. A swellable material may swell to a volume that is less than 80 times the non-swollen volume of the swellable material, such as less than 65 times the non-swollen volume, such as less than 55 times the non-swollen volume, such as less than 45 times the non-swollen volume, such as less than 35 times the non-swollen volume, such as less than 25 times the non-swollen volume, such as less than 15 times the non-swollen volume, such as less than 10 times the non-swollen volume, such as less than 5 times the non-swollen volume of the swellable material.

Exemplary swellable materials may additionally or alternatively have capability to absorb an amount of water that exceeds the weight of the swellable material. For example, an exemplary swellable material may have the capacity to absorb from 2 to 30 times its weight in distilled water, such as from 2 to 5 times its weight, such as from 2 to 10 times its weight, such as from 4 to 10 times its weight, such as from 8 to 20 times its weight, such as from 10 to 15 times its weight, such as from 15 to 30 times its weight, such as from 20 to 30 times its weight in distilled water. Exemplary swellable material may have the capacity to absorb at least 2 times its weight in distilled water, such as at least 4 times its weight, such as at least 5 times its weight, such as at least 8 times its weight, such as at least 10 times its weight, such as at least 15 times its weight, such as at least 20 times its weight, such as at least 30 times its weight in distilled water. The particular swellable materials used may be selected based on the specific application and performance requirements thereof. Such swellable materials are typically capable of being dispersed in the form of particles and/or discrete domains of a micro-scale and/or nano-scale size. The micro-scale and/or nano-scale particles and/or domains may have any one or more of a variety of different shapes, including cylindrical, elliptical, flake-like, nodular, plate-like, spherical, tubular, fibrous, branched, and so forth. The shape (or morphology) of swellable materials in the form of particles may vary depending upon the specific application. For example, generally spherical morphologies (such as solid beads, microbeads, or hollow spheres), can be used, as well as particles that are cubic, platy, acicular (elongated or fibrous) or lamellar. Additionally, the swellable particles and/or discrete domains may have an internal structure that is hollow, porous and/or void free; e.g., a hollow center with porous or solid walls, and so forth.

The size of the particles and/or discrete domains of swellable material may be controlled to optimize performance for a particular application. Swellable materials of a particular size may be formed by any of a number of various methods known in the art, including pulverizing and classifying dry particulate material, crystallization, precipitation, gas phase condensation, chemical attrition, etc. As an example, bulk swellable materials may be milled with milling media to a micro-scale and/or nano-scale size in the presence of a solvent (water and/or an organic solvent) and optionally in the presence of a polymeric grind resin and/or a dispersant. Either hydrophobic or hydrophilic dispersants can be used depending on the particular swellable material.

In some embodiments, particles and/or discrete domains of swellable material may have a micro-scale size characterized by an average cross-sectional dimension from 1 μm to 2000 μm, such as from 5 μm to 1,000 μm, such as from 10 μm to 500 μm, such as from 50 μm to 500 μm. The average cross-sectional dimension may be greater than 1 μm, such as greater than 10 μm, such as greater than 25 μm, such as greater than 50 μm, such as greater than 100 μm, such as greater than 200 μm, such as greater than 300 μm, such as greater than 700 μm, such as greater than 1100 μm, such as greater than 1600 μm, such as greater than 1800 μm. The average cross-sectional dimension of such micro-scale particles and/or discrete domains may be 2000 μm or less, such as 1800 μm or less, such as 1500 μm or less, such as 1200 μm or less, such as 900 μm or less, such as 600 μm or less, such as 300 μm or less, such as 100 μm or less, such as 75 μm or less, such as 45 μm or less, such as 15 μm or less, such as 5 μm or less.

Additionally, or in the alternative, in some embodiments, particles and/or discrete domains of swellable material may have a nano-scale size characterized by an average cross-sectional dimension from 1 nm to 1,000 nm, such as from 5 nm to 800 nm, such as from 10 nm to 500 nm, such as from 20 nm to 200 nm. The average cross-sectional dimension may be greater than 1 nm, such as greater than 10 nm, such as greater than 25 nm, such as greater than 50 nm, such as greater than 100 nm, such as greater than 200 nm, such as greater than 300 nm, such as greater than 500 nm, such as greater than 700 nm, such as greater than 900 nm. The average cross-sectional dimension of such micro-scale particles and/or discrete domains may be 1,000 nm or less, such as 950 nm or less, such as 750 nm or less, such as 550 nm or less, such as 350 nm or less, such as 150 nm or less, such as 90 nm or less, such as 70 nm or less, such as 55 nm or less, such as 35 nm or less, such as 15 nm or less, such as 5 nm or less.

A swellable material may be employed in any desired amount. The amount of swellable material may be described with reference to the concentration of swellable material in the segment of the cementitious panel containing the swellable material. For example, the amount of swellable material may be described as a weight percentage of the core material, the facing material, or the dense layer, as applicable. Regardless of whether the swellable material is employed in the core material, the facing material, or the dense layer, the concentration of the swellable material in such segment may range from 0.1 wt. % to 90 wt. % of such segment, such as from 1 wt. % to 90 wt. %, such as from 1 wt. % to 75 wt. %, such as from 5 wt. % to 65 wt. %, such as from 10 wt. % to 60 wt. %, such as from 20 wt. % to 50 wt. %, such as from 30 wt. % to 40 wt. % based on the total weight of the applicable segment. In some embodiments, a swellable material may be employed in an amount ranging from 0.1 wt. % to 25 wt. %, such as from 0.5 wt. % to 25 wt. %, such as from 1 wt. % to 25 wt. %, such as from 5 wt. % to 20 wt. %, such as from 10 wt. % to 20 wt. % based on the total weight of the applicable segment. In another embodiment, a swellable material may be employed in an amount ranging from 25 wt. % to 75 wt. %, such as from 40 wt. % to 70 wt. %, such as from 50 wt. % to 70 wt. %, such as from 55 wt. % to 65 wt. % based on the total weight of the applicable segment. The swellable material may be employed in an amount of at least 1%, such as at least 10%, such as at least 20%, such as at least 30%, such as at least 40%, such as at least 50%, such as at least 60%, such as at least 70%, based on the total weight of the applicable segment. The swellable material may be employed in an amount of less than 100%, such as less than 90%, such as less than 80%, such as less than 75%, such as less than 65%, such as less than 60%, such as less than 55%, such as less than 45%, such as less than 40%, such as less than 30%, such as less than 20%, such as less than 10%, such as less than 5%%, based on the total weight of the applicable segment.

a. Inorganic Swellable Materials

Suitable inorganic swellable materials include clays or siliceous materials, as well as particles of aluminum oxides, titanium oxides (e.g., titanium dioxide), zinc oxides, antimony oxides, zirconia, magnesia, zinc sulfide, barium sulfate, strontium sulfate, cesium oxide, yttrium oxide, colloidal yttria, zirconia, colloidal zirconia, calcium carbonate, and/or magnesium carbonate. Additional suitable inorganic swellable materials include aluminum hydroxide (ATH), magnesium hydroxide (MDH), refractory fibers (e.g. alumina or zirconia), magnesium phosphate pentahydrate, magnesium sulfate heptahydrate, zinc borate, magnesium carbonate basic pentahydrate, hydromagnesite, sodium borate decahydrate, perlite, intumescents, and melamine polymers. Exemplary inorganic swellable materials may exist in the form of layers including a combination of tetrahedral sheets and octahedral sheets. Some swellable materials may have a 2:1 ratio of octahedral sheets to tetrahedral sheets. Some swellable materials may include a combination of inorganic materials including one or more inorganic materials that individually are not swellable. However, it will be appreciated that particles or discrete domains that include an inorganic material that is not swellable will nevertheless be regarded as a swellable material when such particles or discrete domains as a whole have a capacity to swell when contacted with moisture or water. As an example, some materials that have a capacity to swell when contacted with water have a 2:1 ratio of octahedral sheets to tetrahedral sheets, while some materials that lack as capacity to swell when contacted with water have a 1:1 ratio of octahedral sheets to tetrahedral sheets. A combination of such materials may nevertheless be regarded as a swellable material, at least because a portion of the material has a capacity to swell when contacted with water.

In some embodiments, siliceous particles may be particularly suitable swellable materials. Examples of suitable siliceous particles include particles of crystalline or amorphous phyllosilicates and micaceous minerals, including fumed silica, amorphous silica, colloidal silica, and surface-modified silica. Suitable phyllosilicates include, for example, beidelite, hectorite, kenyaite, laponite, magadite, medmontite, montmorillonite, nontronite, phlogopite, saponite, sauconite, smectite, stevensite, vermiculite, and volkonskoite, as well as combinations of any of the foregoing. Smectite and vermiculite are particularly suitable, as these materials have a pronounced ability to adsorb water. Suitable smectite particles include montmorillonite (often referred to as bentonite), beidelite, nontronite, hectorite, saponite, sobockite, svinfordite, sauconite, and laponite, as well as montmorillonite salts, such as sodium montmorillonite, magnesium montmorillonite, calcium montmorillonite, arcillite (i.e., calcined montmorillonite), and so forth. Further suitable phyllosilicates include kaolin minerals (including kaolinite, dickite, and hacrite); micaceous minerals (e.g., illite) and mixed illite/smectite minerals, such as rectorite, tarosovite, ledikite and admixtures of illites with the phyllosilicates named above; serpentine minerals, chlorite minerals, sepolite, palygorskite, and bauxite, as well as combinations of any of the foregoing. Additional suitable siliceous materials include talc, gypsum, calcite, diatomaceous earth, natural and synthetic zeolites, cement, calcium silicate, sodium aluminum silicates (e.g., nonzeolite silicates), aluminum polysilicate, magnesium silicates, wollastonite, alumina silica gels, glass particles, pumice, tuff, and the like. Of the silicas, precipitated silica, silica gel, or fumed silica may be particularly suitable. In addition, the silica may be a surface-modified silica.

Suitable inorganic swellable materials may additionally include metal nanoparticles or fibers, such as molybdenum, platinum, palladium, nickel, aluminum, copper, gold, iron, silver, alloys of any of the foregoing, as well as combinations or mixtures of any of the foregoing. In some embodiments, an inorganic swellable material may include metal fibers, such as aluminum, copper, or steel metal fibers. Exemplary aluminum particles include alumina, colloidal alumina, fumed alumina, and calcined alumina. Further suitable inorganic swellable materials include graphite; ceramic materials; carbides; nitrides, such as boron nitride; borides; sulfides, such as molybdenum disulfide, tantalum disulfide, tungsten disulfide, silver sulfide, and zinc sulfide; as well as combinations of any of the foregoing.

Another type of inorganic material that may be included in a swellable material includes inorganic polymeric materials. In one embodiment, a swellable material may include an inorganic polymeric material. Inorganic polymeric materials include polymeric materials that have a backbone chain with a repeating unit based on an element other than carbon, such as Al, B, Fe, Ge, N, O, P, S, Si, Sn, as well as combinations of these, such as combinations of N and P, Si and O, S and N, Fe and Si, Al and O, and so forth. Inorganic polymeric materials may include homopolymers, copolymers, random copolymers, block copolymers, graft copolymers, atactic polymers, isotactic polymers, syndiotactic polymers, linear polymers, and/or branched polymers. When mixtures of polymers are used, the mixture may be homogeneous, or the mixture may include two or more polymeric phases. As examples, suitable inorganic polymeric swellable materials include polyphosphazenes, polysilanes, polysiloxanes, polygermanes, polymeric sulfur, polymeric selenium, silicones, aluminum-containing polymers (e.g., poly(acyloxyaloxane), poly(aluminoxane)), ferrocene-containing polymers (e.g., poly(ferrocenylsilanes)), as well as combinations of any of the foregoing.

Still another type of inorganic material that may be included in a swellable material includes inorganic pigments. In one embodiment, a swellable material includes an inorganic pigment. Example inorganic pigments include aluminum-containing pigments (e.g., zeolite-based minerals), antimony-containing pigments (e.g., antimony(III) oxide), arsenic-containing pigments (e.g., realgar), barium-containing pigments (e.g., barium sulfate), bismuth-containing pigments, cadmium-containing pigments (e.g., cadmium sulfide), carbon-containing pigments (e.g., carbon black), chromium-containing pigments (e.g., chromium(III) oxide, lead(II) chromate), cobalt-containing pigments (e.g., cobalt phosphate, cobalt(II) oxide-aluminum oxide, cobalt(II) aluminate), copper-containing pigments (e.g., barium-copper-silicates, calcium copper silicate, azurite), iron-containing pigments (e.g., ochre, lead antimonate), lead-containing pigments (e.g., minium, lead(II) carbonate), manganese-containing pigments (e.g., YInMn, manganese(IV) oxide), mercury-containing pigments (e.g., mercuric sulfides), silica-containing pigments, tin-containing pigments (e.g., tin(IV) sulfide), titanium-containing pigments (e.g., titanium(III) oxide, titanium(IV) oxide), and zinc-containing pigments (e.g., zinc chromate, zinc oxide).

1. Inorganic Swellable Materials with Organic Surface Treatments

In some embodiments, exemplary inorganic swellable materials may contain an organic surface treatment. In some embodiments, an organic surface treatment may improve bonding between the swellable material with the facing material 104 or the core layer 102 and/or may prevent expansion of the swellable material during board formation. In one embodiment, the organic surface treatment may be formed from a quaternary onium (e.g., salt or ion). In the case of swellable materials with a layered structure, the organic surface treatment may become intercalated via ion-exchange into the interlayer spaces between adjacent layers of swellable material. The quaternary onium ion may have the following structure:

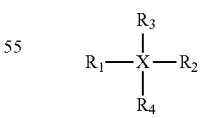

wherein

X is N, P, S, or O; and $R_1$, $R_2$, $R_3$ and $R_4$ are independently hydrogen or organic moieties, such as linear or branched alkyl, aryl or aralkyl moieties having 1 to about 24 carbon atoms.

Particularly suitable quaternary ammonium ions are those having the structure below:

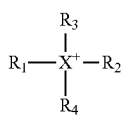

wherein $R_1$ is a long chain alkyl moiety ranging from $C_6$ to $C_{24}$, straight or branched chain, including mixtures of long chain moieties, such as $C_6$, $C_8$, $C_{10}$, $C_{12}$, $C_{14}$, $C_{16}$, $C_{18}$, $C_{20}$, $C_{22}$ and $C_{24}$, alone or in any combination; and $R_2$, $R_3$ and $R_4$ are moieties, which may be the same or different, selected from the group consisting of H, alkyl, hydroxyalkyl, benzyl, substituted benzyl, e.g., straight or branched chain alkyl-substituted and halogen-substituted; ethoxylated or propoxylated alkyl; ethoxylated or propoxylated benzyl (e.g., 1-10 moles of ethoxylation or 1-10 moles of propoxylation).

Additional useful multi-charged spacing/coupling agents include for example, tetra-, tri-, and di-onium species such as tetra-ammonium, tri-ammonium, and di-ammonium (primary, secondary, tertiary, and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

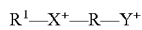

wherein

X+ and Y+, are the same or different and are ammonium, sulfonium, phosphonium, or oxonium radicals such as —NH(CH$_3$)$_2^+$, —NH$_2$(CH$_3$)$^+$, —N(CH$_3$)$_3^+$, —N(CH$_3$)$_2$(CH$_2$CH$_3$)$^+$, —N(CH$_3$)(CH$_2$CH$_3$)$_2^+$, —S(CH$_3$)$_2^+$, —S(CH$_3$)$_2^+$, —P(CH$_3$)$_3^+$, —NH$_3^+$, etc.;

R is an organic spacing, backbone radical, straight or branched, such as those having from 2 to 24 carbon atoms, and in some embodiments from 3 to 10 carbon atoms, in a backbone organic spacing molecule covalently bonded at its ends to charged N$^+$, P$^+$, S$^+$ and/or O$^+$ cations; and R$^1$ can be hydrogen, or a linear or branched alkyl radical of 1 to 22 carbon atoms, linear or branched, and in some embodiments, 6 to 22 carbon atoms.

Exemplary R groups are alkyls (e.g., methyl, ethyl, butyl, octyl, etc.); aryl (e.g., benzyl, phenylalkyl, etc.); alkylenes (e.g., methylene, ethylene, octylene, nonylene, tert-butylene, neopentylene, isopropylene, sec-butylene, dodecylene, etc.); alkenylenes (e.g., 1-propenylene, 1-butenylene, 1-pentenylene, 1-hexenylene, 1-heptenylene, 1-octenylene, etc.); cycloalkenylenes (e.g., cyclohexenylene, cyclopentenylene, etc.); hydroxyalkyl (e.g. hydroxymethyl, hydroxyethyl, hydroxyl-n-propyl, hydroxyisopropyl, hydroxyl-n-butyl, hydroxyl-iso-butyl, hydroxyl-tert-butyl, etc.), alkanoylalkylenes (e.g., butanoyl octadecylene, pentanoyl nonadecylene, octanoyl pentadecylene, ethanoyl undecylene, propanoyl hexadecylene, etc.); alkylaminoalkylenes (e.g., methylamino octadecylene, ethylamino pentadecylene, butylamino nonadecylene, etc.); dialkylaminoalkylene (e.g., dimethylamino octadecylene, methylethylamino nonadecylene, etc.); arylaminoalkylenes (e.g., phenylamino octadecylene, p-methylphenylamino nonadecylene, etc.); diarylaminoalkylenes (e.g., diphenylamino pentadecylene, p-nitrophenyl-p'-methylphenylamino octadecylene, etc.); alkylarylaminoalkylenes (e.g., 2-phenyl-4-methylamino pentadecylene, etc.); alkylsulfinylenes, alkylsulfonylenes, alkylthio, arylthio, arylsulfinylenes, and arylsulfonylenes (e.g., butylthio octadecylene, neopentylthio pentadecylene, methyl sulfinylnonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec-butylthio octadecylene, naphthylthio undecylene, etc.); alkoxycarbonylalkylenes (e.g., methoxycarbonylene, ethoxycarbonylene, butoxycarbonylene, etc.); cycloalkylenes (e.g., cyclohexylene, cyclopentylene, cyclooctylene, cycloheptylene, etc.); alkoxyalkylenes (e.g., methoxymethylene, ethoxymethylene, butoxymethylene, propoxyethylene, pentoxybutylene, etc.); aryloxyalkylenes and aryloxyarylenes (e.g., phenoxyphenylene, phenoxymethylene, etc.); aryloryalkylenes (e.g., phenoxydecylene, phenoxyoctylene, etc.); alylalkylenes (e.g., benzylene, phenthylene, 8-phenyloctylene, 10-phenyldecylene, etc.); alkylarylenes (e.g., 3-decylphenylene, 4-octylphenylene, 4-nonylphenylene, etc.); and polypropylene glycol and polyethylene glycol substituents (e.g., ethylene, propylene, butylene, phenylene, benzylene, tolylene, p-styrylene, p-phenylmethylene, octylene, dodecylene, octadecylene, methoxyethylene, etc.), as well as combinations thereof. Such tetra-, tri-, and di-ammonium, -sulfonium, -phosphonium, -oxonium; ammonium/sulfonium; ammonium/phosphonium; ammonium/oxonium; phosphonium/oxonium; sulfonium/oxonium; and sulfonium/phosphonium radicals are well known in the art and can be derived from the corresponding amines, phosphines, alcohols or ethers, and sulfides.

Particularly suitable multi-charged spacing/coupling agent compounds are multi-onium compounds that include at least two primary, secondary, tertiary or quaternary ammonium, phosphonium, sulfonium, and/or oxonium ions having the following general formula:

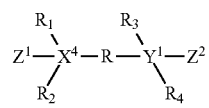

wherein

R is an alkylene, aralkylene or substituted alkylene charged atom spacing moiety; and $Z_1$, $Z_2$, $R_1$, $R_2$, $R_3$, and $R_4$ may be the same or different and selected from the group consisting of hydrogen, alkyl, aralkyl, benzyl, substituted benzyl (e.g., e.g., straight or branched chain alkyl-substituted and halogen-substituted); ethoxylated or propoxylated alkyl; ethoxylated or propoxylated benzyl (e.g., 1-10 moles of ethoxylation or 1-10 moles of propoxylation).

Particularly suitable organic cations may include, for instance, quaternary ammonium compounds, such as dimethyl bis[hydrogenated tallow] ammonium chloride (2M2HT), methyl benzyl bis[hydrogenated tallow] ammonium chloride (MB2HT), methyl tris[hydrogenated tallow alkyl] chloride (M3HT), etc. An example of a suitable inorganic swellable material is Nanomer™ 1.44P, which is a quaternary ammonium modified montmorillonite and commercially available from Nanocor, Inc. Other suitable inorganic swellable materials include those available from Southern Clay Products, such as Cloisite™ 15A, Cloisite™ 30B, Cloisite™ 93A, and Cloisite™ Na$^+$.

b. Organic Swellable Materials

Examples of organic swellable materials include without limitation natural and synthetic superabsorbent materials. Natural superabsorbent materials include guar gum, agar, pectin, cellulosic fibers including ultrafine cellulose, nanocrystalline cellulose, and microcrystalline cellulose, and the like. Synthetic superabsorbent materials include superabsorbent polymers such as alkali salts of polyacrylic acids, polyacrylamides, polyvinyl alcohol, ethylene-maleic anhydride copolymers, polyvinyl ethers, nanocrystalline cellulose, microcrystalline cellulose, methyl cellulose, carboxymethyl cellulose, hydroxypropylcellulose, hydroxypropylmethylcellulos, polyvinylmorpholinone, and polymers and copolymers of vinyl sulfonic acid, polyacrylates, polyacrylamides, polyvinylpyrridine, and the like. Exemplary alkali salts of polyacrylic acids include poly (acrylic acid)-potassium salt, poly(acrylic acid)-sodium salt, poly(acrylic acid-co-acrylamide)-potassium salt, poly (acrylic acid)-sodium salt-graft-poly(ethylene oxide), poly (2-hydroxyethyl methacrylate), poly(2-hydroxypropyl methacrylate), and poly(isobutylene-co-maleic acid)-sodium salt. Exemplary microcrystalline cellulose includes ultrafine cellulose, colloidal cellulose, and nanocrystalline or microcrystalline cellulose gel, which are available, for example, from J. Rettenmaier USA LP under the designations VITAPUR®, VITACEL®, and ABROCEL®. Other suitable polymers include hydrolyzed acrylonitrile grafted starch, acrylic acid grafted starch, and isobutylene maleic anhydride polymers and mixtures thereof. Superabsorbent polymers may preferably be lightly crosslinked to render the materials substantially water insoluble. Crosslinking may, for example, be accomplished by irradiation or by covalent, ionic, van der Waals, or hydrogen bonding.

An exemplary superabsorbent polymer may be capable of absorbing at least 10 times its weight in distilled water, such as at least 50 times its weight, such as at least 100 times its weight, such as at least 300 times its weight, such as at least 400 times its weight, such as at least 500 times its weight, such as at least 700 times its weight, such as at least 1,000 times its weight in distilled water. Superabsorbent polymers are generally formed from a three-dimensional crosslinked polymer network that contains repeating units derived from one or more ethylenically (e.g., monoethylenically) unsaturated monomeric compounds having at least one hydrophilic radical, such as a carboxyl, carboxylic acid anhydride, carboxylic acid salt, sulfonic acid, sulfonic acid salt, hydroxyl, ether, amide, amino, or quaternary ammonium salt group. These monomeric compounds can be selected, for example, from ethylenically unsaturated carboxylic acids and acid anhydrides, ethylenically unsaturated sulfonic acids, and mixtures thereof.

In some embodiments, a swellable material may include a superabsorbent polymer that includes an ethylenically unsaturated carboxylic acid monomeric compound. Suitable ethylenically unsaturated carboxylic acid and carboxylic acid anhydride monomeric compounds for forming superabsorbent polymers include, for example, acrylic acid, methacrylic acid, ethacrylic acid, α-chloroacrylic acid, α-cyanoacrylic acid, crotonic acid (β-methylacrylic acid), α-phenylacrylic acid, β-acryloxy-propionic acid, sorbic acid, α-chlorosorbic acid, angelic acid, cinnamic acid, β-chlorocinnamic acid, β-stearylacrylic acid, itaconic acid, monoalkyl esters of itaconic acid, citraconic acid, mesaconic acid, glutaconic acid, aconitic acid, maleic acid, monoalkyl esters of maleic acid, furmaric acid, monoalkyl esters of fumaric acid, dialkyl esters of maleic and fumaric acids, tricarboxyethylene, and maleic anhydride. Additionally, suitable carboxylic acid monomeric compounds include salts of carboxylic acids, such as alkali metal salts, ammonium salts, amine salts, and so forth. Such salts of carboxylic acids include, for example, sodium (meth)acrylate, trimethylamine(meth)acrylate, triethanolamine-(meth)acrylate, sodium maleate, methylamine maleate, and so forth.

In some embodiments, a swellable material may include a superabsorbent polymer that includes an ethylenically unsaturated sulfonic acid monomeric compound. Suitable ethylenically unsaturated sulfonic acid monomeric compounds for forming superabsorbent polymers include, for example, aliphatic or aromatic vinyl sulfonic acids and salts of vinyl sulfonic acids; acrylic or methacrylic sulfonic acids and salts of methacrylic sulfonic acids; and combinations of any of the foregoing. Exemplary aliphatic or aromatic vinyl sulfonic acids include vinylsulfonic acid, allyl sulfonic acid, vinyl toluene sulfonic acid, and styrene sulfonic acid. Exemplary acrylic and methacrylic sulfonic acids include sulfoethyl acrylate, sulfoethyl methacrylate, sulfopropyl acrylate, sulfopropyl methacrylate, 2-hydroxy-3-methacryloxypropyl sulfonic acid, and 2-acrylamide-2-methylpropane sulfonic acid, and so forth.

Methacrylic acid monomeric compounds may be particularly suitable. In some embodiments, a swellable material may include a superabsorbent polymer that includes a methacrylic acid monomeric compound. Some examples of suitable ethylenically unsaturated methacrylic acid monomeric compounds include alkyl esters of (meth)acrylic acids, such as ethyl (meth)acrylate, methyl (meth)acrylate, butyl (meth) acrylate, 2-ethylhexyl (meth)acrylate, 2-hydroxyethyl (meth)acrylate, hydroxypropyl (meth)acrylate, hydroxy butyl (meth)acrylate, isobornyl (meth)acrylate, lauryl (meth) acrylate, and ethylene glycol di(meth)acrylate, and so forth.

In some embodiments, ethylenically unsaturated monomeric compounds may include an ethylenically unsaturated beta-hydroxy ester functional monomer and an epoxy compound such as a glycidyl ethers and/or glycidyl esters. Suitable epoxy compounds include those having the following structure:

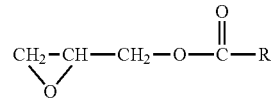

wherein R is a hydrocarbon radical containing from 4 to 26 carbon atoms. Suitable glycidyl esters include those commercially available from Exxon Chemical Company under the designation GLYDEXX-10, or from Shell Chemical Company under the designation CARDURA E.

The ethylenically unsaturated monomeric compound(s) are typically polymerized in the presence of a crosslinking agent to provide a crosslinked polymer. Suitable crosslinking agents typically possess two or more groups that are capable of reacting with the ethylenically unsaturated monomeric compound and that are at least partially water soluble or water dispersible, or at least partially soluble or dispersible in an aqueous monomer mixture. Examples of suitable crosslinking agents may include, for instance, tetraallyloxyethane, N,N'-methylene bisacrylamide, N,N'-methylene bismethacrylamide, triallylamine, trimethylol propane triacrylate, glycerol propoxy triacrylate, divinylbenzene, N-methylol acrylamide, N-methylol methacrylamide, glycidyl methacrylate, polyethylene polyamines, ethyl diamine, ethyl glycol, glycerin, tetraallyloxyethane and triallyl ethers of pentaerythritol, aluminates, silica, alumosilicates, etc., as well as combinations thereof. The amount of the crosslinking agent may vary, but is typically present in an amount from about 0.005 to about 1.0 mole percent based on moles of the ethylenically unsaturated monomeric compound(s).

In the embodiments described above, crosslinking generally occurs during polymerization. In other embodiments, however, the polymer may contain a latent functional group that is capable of becoming crosslinked when desired. For instance, the polymer may contain an alkoxysilane functional group which, upon exposure to water, forms a silanol functional group that condenses to form a crosslinked polymer. One particular example of such a functional group is a trialkoxysilane having the following general structure:

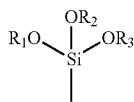

wherein $R_1$, $R_2$ and $R_3$ are alkyl groups independently having from 1 to 6 carbon atoms. To introduce such a functional group into the polymer structure, a monomeric compound may be employed that contains the functional group, such as an ethylenically unsaturated monomer containing a trialkoxysilane functional group.

Composite Swellable Materials a. Superabsorbent Particles

Superabsorbent particles include both superabsorbent polymers as discussed above, and complexes or mixtures of superabsorbent polymers with inorganic particles such the inorganic swellable materials described herein. Similar to the superabsorbent polymers discussed above, superabsorbent particles formed of complexes or mixtures of superabsorbent polymers with inorganic swellable materials are water-swellable, water insoluble materials capable of absorbing several times their weight in water. An exemplary superabsorbent particle may be capable of absorbing at least 10 times its weight in distilled water, such as at least 50 times its weight, such as at least 100 times its weight, such as at least 300 times its weight, such as at least 400 times its weight, such as at least 500 times its weight, such as at least 700 times its weight, such as at least 1,000 times its weight in distilled water.

Superabsorbent particles also include complexes of superabsorbent polymers and inorganic swellable material. In various embodiments, one or more inorganic swellable materials may be admixed or crosslinked with one or more superabsorbent polymers. Any one or more types of inorganic swellable material described herein may be admixed or crosslinked with a superabsorbent polymer. Inorganic swellable materials may be added to superabsorbent polymer before, during, and/or after polymerization. The inorganic swellable material and the superabsorbent polymer may be physically and/or chemically associated in a form such that the polymer component and the inorganic swellable material component are not readily physically separable. For example, a superabsorbent polymer particle and an inorganic swellable material may be present in a single particle, as opposed to an admixture of discrete superabsorbent polymer particles and discrete inorganic swellable material particles. An exemplary superabsorbent composite includes a poly(acrylic acid)-phyllosilicate composite. A poly(acrylic acid)-phyllosilicate composite may be formed by graft copolymerization of acrylic acid onto phyllosilicate particles. For example, phyllosilicate particles may be dispersed in an acrylic acid monomer solution, and a crosslinking agent and a cross-linking initiator may be added to the dispersed solution.

In one embodiment, an admixture of superabsorbent polymer particles and inorganic swellable material particles may be formed by polymerizing one or more monomeric components, comminuting the resulting polymer, then adding the inorganic swellable material to the comminuted polymer particles. The inorganic swellable material may be added as a powder or in the form of an aqueous slurry. The polymer particles and the inorganic swellable material particles may be admixed, such as by extrusion, to disperse the inorganic swellable material throughout the polymer. The resulting mixture may be at least partially neutralized using a base, comminuted, dried, and sized. Additionally, or in the alternative, the superabsorbent polymer particles and inorganic swellable material particles may be crosslinked (i.e., surface-crosslinked). For example, a surface crosslinking agent may be combined with the polymer particles and the inorganic swellable material particles and the combination subjected to azeotropic dehydration, with crosslinking occurring during the dehydration.

Suitable surface crosslinking agents include, but are not limited to, glycidyl compounds, such as ethylene glycol diglycidyl ether, diglycidyl phosphonates, and bischlorohydrin ethers of polyalkylene glycols; alkoxysilyl compounds; polyaziridines based on polyethers or substituted hydrocarbons such as bis-N-aziridinomethane; polyamines or polyamidoamines and their reaction products with epichlorohydrin; carbonic acid derivatives, such as urea, thiourea, guanidine, dicyandiamide, 2-oxazolidinone and its derivatives, bisoxazoline, polyoxazolines, di- and polyisocyanates; di- and poly-N-methylol-compounds, such as methylenebis (N-methylolmethacrylamide) or melamine-formaldehyde resins; polyols, such as ethylene glycol, 1,2-propanediol, 1,4-butanediol, glycerol, methyltriglycol, polyethylene glycols having an average molecular weight Mw of 200-10,000, pentaerythritol, sorbitol, the ethoxylates of these polyols and their esters with carboxylic acids or carbonic acid such as ethylene-carbonate or propylene carbonate; and compounds having two or more blocked isocyanate groups such as, trimethyl-hexamethylene diisocyanate blocked with 2,2,6,6-itetramethylpiperidin-4-one.

In embodiments where the superabsorbent particles contain a superabsorbent polymer and an inorganic swellable material, the superabsorbent particles may contain from 35 wt. % to 95 wt. % of the superabsorbent polymer, such as from 50 wt. % to 90 wt. %, such as from 65 wt. % to 85 wt. % of the superabsorbent polymer. Conversely, the superabsorbent particles may contain from 5 wt. % to 65 wt. % of the inorganic swellable material, such as from 5 wt. % to 60 wt. %, such as from 10 wt. % to 40 wt. %, such as from 15 wt. % to 35 wt. % of the inorganic swellable material.

Superabsorbent particles may be porous or non-porous in nature, however, exemplary superabsorbent particles generally possess a porous network which may contain a combination of closed and open-celled pores. The total porosity of the superabsorbent particles may be relatively high. For example, the superabsorbent particles may exhibit a total pore area of about 2 square meters per gram ($m^2/g$) or more, in some embodiments from 10 to 160 $m^2/g$, such as from 20 to 60 $m^2/g$. The percent porosity may also be about 5% or more, such as 20% to 60%, such as from 25% to 40%. Another parameter that is characteristic of porosity is bulk density. In this regard, the bulk density of the superabsorbent particles may be less than 0.8 grams per cubic centimeter (g/cm³), such as from 0.1 to 0.6 g/cm³, such as from 0.2 to 0.6 g/cm³, as determined at a pressure of 0.58 psi via mercury intrusion.

b. Coated or Encapsulated Swellable Materials

Another type of composite swellable material includes swellable materials that have been coated or encapsulated with one or more encapsulating or coating materials. The encapsulation or coating may be configured to prevent or delay the water-swellable properties of the swellable material until a future period or point in time. For example, the encapsulation or coating may prevent or inhibit the swellable material from absorbing water or moisture during the manufacturing process of the cementitious panel, where water-swellable properties would generally be undesirable and may negatively affect crystallization of the cementitious material or other properties of the panel. In some embodiments, a coating or encapsulation may be capable of dissolving or melting, such as with exposure to water and/or temperature. For example, a coating or encapsulation may dissolve after having been exposed to a certain amount of water or moisture, such that the swellable material may be exposed from the coating or encapsulation with particularly moist or wet conditions. When the coating or encapsulation dissolves, the swellable material within the coating or encapsulation may be exposed, thereby allowing the swellable material to absorb water or moisture that may otherwise propagate into the cementitious panel.

As another example, a coating or encapsulation may dissolve or melt under elevated temperature conditions of a kiln or oven in a typical manufacturing process for cementitious panels, such that the swellable material may be exposed from the coating or encapsulation after having passed through the kiln or oven during manufacturing. In this way, the swellable material may be shielded from moisture or water in the manufacturing process, yet exposed and capable of swelling to prevent or mitigate excessive moisture or water penetration thereafter.

Additionally, or in the alternative, in some embodiments, a coating or encapsulation may be capable of rupturing, for example when the continuity of a cementitious panel is interrupted such as by fasteners (e.g., nails, screws, etc.) being driven through the cementitious panel or other sources of punctures, cracks, cuts, perforations, or the like. When the coating or encapsulation ruptures, the swellable material within the coating or encapsulation may be exposed, thereby allowing the swellable material to absorb water or moisture that may otherwise propagate into the cementitious panel.

Coated or encapsulated swellable materials may be utilized alone or together with other swellable materials. In various embodiments, a coated or encapsulated swellable material may be combined with another swellable material to provide an admixture or complex. For example, a coated or encapsulated swellable material may be physically and/or chemically associated with another swellable material. Additionally, or in the alternative, a coated or encapsulated swellable material may be crosslinked with one or more other swellable materials.

Suitable swellable materials for forming a coated or encapsulated swellable material may be selected from any one or more organic swellable materials and/or inorganic swellable materials described herein. Suitable coating or encapsulating material for forming a coated or encapsulated swellable material may include wax, ethyl cellulose, polyvinyl alcohol (e.g., fully hydrolyzed polyvinyl alcohol), starch, gelatin, polymeric materials, sodium alginate, epoxy resins, and the like. Mixtures of any of the organic swellable materials and/or inorganic swellable materials described herein may be used. The specific choice of swellable materials will depend upon the specific application and performance requirements of the coated swellable material. The thickness of the coating or encapsulation may be selected depending upon the specific application. For a coating or encapsulation that is intended to dissolve or melt, the thickness of the coating may correlate to the degree of exposure necessary or sufficient to dissolve or melt the coating or encapsulation. A coating or encapsulation may have a micro-scale thickness or a nano-scale thickness.

In an exemplary embodiment, a coating or encapsulation may have a micro-scale thickness, with an average thickness of from 0.1 to 1,000 micrometers, such as from 0.1 to 900 μm, such as from 0.1 to 500 μm, such as from 0.1 to 250 μm, such as from 0.1 to 100 μm, such as from 0.1 to 50 μm, such as from 1 to 900 μm, such as from 1 to 100 μm, such as from 10 to 500 μm, such as from 10 to 250 μm, such as from 50 to 150 μm, such as from 100 to 250 μm, such as from 250 to 500 μm, such as from 500 to 1,000 μm, such as from 500 to 750 μm, such as from 750 to 1,000 μm. The coating or encapsulation may have an average thickness of at least 0.1 micrometer, such as at least 1 μm, such as at least 5 μm, such as at least 10 μm, such as at least 25 μm, such as at least 50 μm, such as at least 100 μm, such as at least 150 μm, such as at least 250 μm, such as at least 400 μm, such as at least 600 μm, such as at least 800 μm. The coating or encapsulation may have an average thickness of less than 1,000 micrometer, such as less than 900 μm, such as less than 700 μm, such as less than 600 μm, such as less than 500 μm, such as less than 350 μm, such as less than 225 μm, such as less than 175 μm, such as less than 125 μm, such as less than 100 μm, such as less than 100 μm, such as less than 75 μm, such as less than 40 μm, such as less than 20 μm, such as less than 10 μm, such as less than 5 μm.

In an exemplary embodiment, a coating or encapsulation may have a nano-scale thickness, with an average thickness of from 0.1 to 1,000 nanometers, such as from 0.1 to 900 nm, such as from 0.1 to 500 nm, such as from 0.1 to 250 nm, such as from 0.1 to 100 nm, such as from 0.1 to 50 nm, such as from 1 to 900 nm, such as from 1 to 100 nm, such as from 10 to 500 nm, such as from 10 to 250 nm, such as from 50 to 150 nm, such as from 100 to 250 nm, such as from 250 to 500 nm, such as from 500 to 1,000 nm, such as from 500 to 750 nm, such as from 750 to 1,000 nm. The coating or encapsulation may have an average thickness of at least 0.1 micrometer, such as at least 1 nm, such as at least 5 nm, such as at least 10 nm, such as at least 25 nm, such as at least 50 nm, such as at least 100 nm, such as at least 150 nm, such as at least 250 nm, such as at least 400 nm, such as at least 600 nm, such as at least 800 nm. The coating or encapsulation may have an average thickness of less than 1,000 micrometer, such as less than 900 nm, such as less than 700 nm, such as less than 600 nm, such as less than 500 nm, such as less than 350 nm, such as less than 225 nm, such as less than 175 nm, such as less than 125 nm, such as less than 100 nm, such as less than 100 nm, such as less than 75 nm, such as less than 40 nm, such as less than 20 nm, such as less than 10 nm, such as less than 5 nm.

Suitable polymeric materials for forming coated or encapsulated swellable materials include acrylic polymers (e.g., polyacrylamide, polyacrylate, poly(acrylate-co-acrylamide)), polyvinyl alcohol polymers (e.g., hydrolyzed polyvinyl alcohol), polyamide polymers, polyurethane polymers, polyester polymers, polyether polymers, silicon-based polymers, and co-polymers of any of the foregoing, as well as mixtures of any of the foregoing. In some embodiments, a coated or encapsulated swellable material can be prepared with one or more ethylenically unsaturated monomeric compounds and/or one or more polymers. In one embodiment, a swellable material may be dispersed in a medium that contains a monomeric compound, and the monomeric compound may be polymerized in the presence of the swellable material. In another embodiment, a swellable material may be dispersed in a medium that contains a polymeric material that has already been formed. In still another embodiment, a swellable material may be admixed with one or more monomeric compounds and/or polymers. Swellable materials may be coated or encapsulated using any desired method known in the art, including physical or chemical methods. Exemplary physical methods include pan coating and air-suspension coating. Exemplary chemical methods include polycondensation, cross-linking, and polymerization.

Fire-Resistive Capabilities

In some embodiments, cementitious panels may include one or more materials that provide fire-resistive properties. Such fire-resistive properties may be provided by way of promotion of char formation, forming an intumescent barrier, forming a glaze barrier, and/or conversion of combustible gases to non-flammable gases.

The presently disclosed swellable materials may provide enhanced fire-resistance capabilities. Such enhanced fire-resistance capabilities may be provided by water-swellable materials. By way of example, suitable water-swellable materials for providing enhanced fire-resistance capabilities include high expansion vermiculites, perlite, and calcium silicates.

In some embodiments, a swellable material may exhibit intumescent properties, meaning that the swellable material may swell when exposed to heat. Such swelling may close gaps, cracks, pores, and the like in a cementitious panel, restricting air flow needed for combustion. An intumescent material may also exhibit low thermal conductivity, reducing the transfer of heat from a fire through a cementitious panel. Additionally, or in the alternative, an intumescent material may also release water vapor when heated, which may be absorbed by water swellable materials, providing further swelling so as to restrict air flow through gaps, cracks, pores, and the like in a cementitious panel.

Exemplary intumescent materials include microporous carbonaceous soft char materials and/or hard char materials. Soft char materials may be formed from a combination of ammonium polyphosphate, pentaeyrthritol, and melamine, with a binder of vinyl acetate or styrene acrylate binder. Hard char materials include sodium silicates graphite.

In addition, or as an alternative to swellable/intumescent materials, exemplary cementitious panels may include a filler material that provides fire-resistive properties. For example, a filler material may undergo an endothermic decomposition reaction when exposed to flames or heat. Such materials may release free water as a result of endothermic decomposition, and the free water may be absorbed by water swellable materials. Exemplary endothermic materials include aluminum trihydroxide (ATH) and magnesium hydroxide. As another example, a filler material may oxidize when exposed to flames or heat, producing carbonaceous char which may prevent further combustion. Exemplary oxidizing materials include phosphates such as ammonium dihydrogenphosphate, ammonium phosphate, and/or urea phosphate.

VOC Removal Properties

In some embodiments, exemplary cementitious panels may contain one or more materials that provide VOC adsorbing properties. One or more of the presently disclosed swellable materials or filler materials may provide VOC adsorbing properties. Exemplary materials with VOC adsorbing capabilities may include activated carbon, carbonates, bicarbonates, carbon black, aluminosilicates (i.e., zeolite, hylloysite, etc.), nano-crystalline metal oxides/hydroxides, coated metal oxides/hydroxides (i.e., halogen coatings), doped metal oxides/hydroxides, surfactant coated nanocrystalline metal oxides, mesoporous nanocrystalline metal oxides, aluminophosphates, mesoporous silica, ethylene urea and its derivatives, clays or siliceous particles (e.g., vermiculite, silica gel, etc.), and/or hydrazide compounds.

In some embodiments, a cementitious panel may additionally or alternatively include a coating that contains one or more photocatalytic materials capable of converting VOCs to harmless substances in the presence of UV or other light irradiation. Exemplary photocatalytic materials include titanium dioxide and mesoporous titanium dioxide. Titanium dioxide may be doped with one or more doping agents such as nitrogen, iron, silver, palladium, platinum, cerium, zirconium, or zinc. The photocatalytic reaction may be catalyzed by a suitable light source including artificial or natural light, including UV light, florescent light, visible light, black light, and/or a combination thereof depending on the particular photocatalyst.

Void Volumes

A cementitious panel may include void volumes having a variety of different characteristics. A cementitious core material may include void volumes resulting from foam introduced into the core material to lower the density of the material. A dense layer may include similar void volumes introduced by foam. A facing material may include void volumes in the form of a porous network or interconnected network of pores. The void volumes or pores in a facing material may be formed as a result of the manner in which the facing material was produced. For example, a facing material may include a polymeric-film may formed of a thermoplastic composition that includes a polymer matrix and a swellable material. The thermoplastic composition may be drawn so as to form a porous network of interconnected pores. Additionally, the swellable material may itself contain pores. As another example, a facing material formed of paper or paperboard, or woven or non-woven fibers or filaments may include void volumes or a network of interconnected pores located between adjacent fibers or filaments or other such materials.

In some embodiments, the average percent volume occupied by the void volumes or pores within a given unit volume of a particular segment of a cementitious panel (e.g., the core layer, the dense layer, or the facing material) may be from 5% to 85% per $cm^3$, such as from 5% to 50% per $cm^3$, such as from 5% to 30% per $cm^3$, such as from 5% to 20% per $cm^3$, such as from 20% to 50% per $cm^3$, such as from 20% to 70% per $cm^3$, such as from 30% to 60% per $cm^3$ of such segment.

The void volumes may be of a nano-scale size, a micro-scale size, and/or a macro-scale size. In some embodiments, nano-scale void volumes may have an average cross-sectional dimension from 5 nm to less than 1000 nm, such as from 5 nm to 900 nm, such as from 10 nm to 500 nm, such as from 50 nm to 250 nm, such as 1000 nm or less, such as 900 nm or less, such as 700 nm or less, such as 500 nm or less, such as 250 nm or less, such as 150 nm or less, such as 100 nm or less, such as 75 nm or less, such as 50 nm or less, such as 10 nm or less. The void volumes may have an average cross-sectional dimension of 5 nm to 900 nm or less, such as 25 nm or more, such as 50 nm or more, such as 75 nm or more, such as 100 nm or more, such as 250 nm or more, such as 500 nm or more, such as 750 nm or more. The term "cross-sectional dimension" generally refers to a characteristic dimension (e.g., width or diameter) of a volume, which is substantially orthogonal to its major axis (e.g., length). The void volumes may also have an average axial dimension within a range from 10 nm to 5000 nm, such as from 50 nm to 2000 nm, such as from 100 nm to 1000 nm. The "axial dimension" is the dimension in the direction of the major axis (e.g. length).

Micro-scale void volumes may have an average cross-sectional dimension from 1 μm to 20 μm, such as from 5 μm to 15 μm, such as from 1 μm to 10 μm, such as from 2 μm to 5 μm, such as 15 μm or less, such as 12 μm or less, such as 9 μm or less, such as 7 μm or less, such as 5 μm or less, such as 3 μm or less. The void volumes may have an average cross-sectional dimension of 1 μm to 20 μm or less, such as 1 μm or more, such as 5 μm or more, such as 10 μm or more, such as 15 μm or more.

Macro-scale void volumes may have an average cross-sectional dimension from 1 mm to 10 mm, such as from 1 mm to 9 mm, such as from 1 mm to 7 mm, such as from 2 mm to 5 mm, such as 10 mm or less, such as 8 mm or less, such as 5 mm or less, such as 3 mm or less, such as 2 mm or less. The void volumes may have an average cross-sectional dimension of 1 mm to 10 mm or less, such as 1 mm or more, such as 3 mm or more, such as 5 mm or more, such as 7 mm or more.

A cementitious panel may include a facing material that is substantially impervious to liquid water yet "breathable" in the sense of being pervious to water vapor and gases. The "breathability" of the facing material may be measured in terms of water vapor transmission rate (WVTR), which generally refers to the rate at which water vapor permeates through a material as measured in units of grams per meter squared per 24 hours ($g/m^2/24$ hrs). Higher WVTR values represent a more breathable material and lower WVTR values represent a less breathable material. The test used to determine the WVTR of a material may vary based on the nature of the material. For example, one technique for measuring WVTR involves the use of a PERMATRAN-W 100K water vapor permeation analysis system, which is commercially available from Modern Controls, Inc. of Minneapolis, Minn. Such a system may be particularly well suited for materials thought to have a WVTR of greater than about 2,000 $g/m^2/24$ hrs. It should be understood, however, that other systems and techniques for measuring WVTR may also be utilized in the present invention. Another technique for measuring WVTR is provided by ASTM E96, Standard Test Methods for Water Vapor Transmission of Materials.

An exemplary facing material may exhibit a surface water resistance according to ASTM C-473 such that the panel absorbs less than 10% of water, such as less than 7.5%, less than 5%, less than 1%, or less than 0.5%, or less than 0.25%. Regardless, a breathable facing material should have sufficient permeability to allow for water vapor to pass through when drying the panels in the oven or kiln. In an exemplary embodiment, the pore structure of the facing material allows it to exhibit a high breathability, such as a WVTR of about 100 to about 10,000 grams/$m^2$-24 hours, such as about 500 to about 10,000 grams/$m^2$-24 hours, such as about 1,000 to about 10,000 grams/$m^2$-24 hours, such as about 1,000 to about 6,000 grams/$m^2$-24 hours, such as about 1,000 to about 5,000 grams/$m^2$-24 hours, such as about 5,000 to about 10,000 grams/$m^2$-24 hours, such as about 5,000 to about 7,000 grams/$m^2$-24 hours, such as about 7,000 to about 10,000 grams/$m^2$-24 hours, such as about 100 grams/$m^2$-24 hours or more, such as about 500 grams/$m^2$-24 hours or more, such as about 1,000 grams/$m^2$-24 hours or more, such as about 2,000 grams/$m^2$-24 hours or more, such as about 5,000 grams/$m^2$-24 hours or more, such as about 7,000 grams/$m^2$-24 hours or more, or such as about 10,000 grams/$m^2$-24 hours or more. The facing material may also limit the amount of liquid water that passes therethrough upon the application of pressure, i.e., it resists a hydrostatic pressure ("hydrohead") of about 50 millibar or more, in some embodiments about 70 millibar or more, in some embodiments about 80 millibar or more, and in some embodiments, about 100 millibar or more without allowing liquid water to pass. A non-breathable facing material may exhibit a WVTR of less than about 100 grams/$m^2$-24 hours, such as less than 50 grams/$m^2$-24 hours, such as less than 25 grams/$m^2$-24 hours.

A breathable facing material may exhibit a porosity from 10 to 20,000 sec/100 cc air, as determined according to ASTM D 726, such as from 10 to 100 sec/100 cc air, such as from 100 to 1,000 sec/100 cc air, such as from 1,000 to 5,000 sec/100 cc air, such as from 5,000 to 10,000 sec/100 cc air, such as from 1,000 to 10,000 sec/100 cc air, such as from 10,000 to 15,000 sec/100 cc air, such as from 15,000 to 20,000 sec/100 cc air, such as from 10,000 to 20,000 sec/100 cc air. The facing material may exhibit a porosity greater than 10 sec/100 cc air, such as greater than 50 sec/100 cc air, such as greater than 100 sec/100 cc air, such as greater than 200 sec/100 cc air, such as greater than 500 sec/100 cc air, such as greater than 1,000 sec/100 cc air, such as greater than 2,500 sec/100 cc air, such as greater than 5,000 sec/100 cc air, such as greater than 7,500 sec/100 cc air, such as greater than 10,000 sec/100 cc air, such as greater than 12,500 sec/100 cc air, such as greater than 15,000 sec/100 cc air. The facing material may exhibit a porosity less than 20,000 sec/100 cc air, such as less than 15,000 sec/100 cc air, such as less than 12,500 sec/100 cc air, such as less than 10,000 sec/100 cc air, such as less than 7,500 sec/100 cc air, such as less than 5,000 sec/100 cc air, such as less than 2,500 sec/100 cc air, such as less than 1,000 sec/100 cc air, such as less than 500 sec/100 cc air, such as less than 200 sec/100 cc air, such as less than 100 sec/100 cc air, such as less than 50 sec/100 cc air. A non-breathable facing material may exhibit a porosity from 25,000 sec/100 cc air to 200,000 sec/100 cc air, as determined according to ASTM D 726, such as from 50,000 to 100,000 sec/100 cc air.

Manufacturing System

Figure 3:
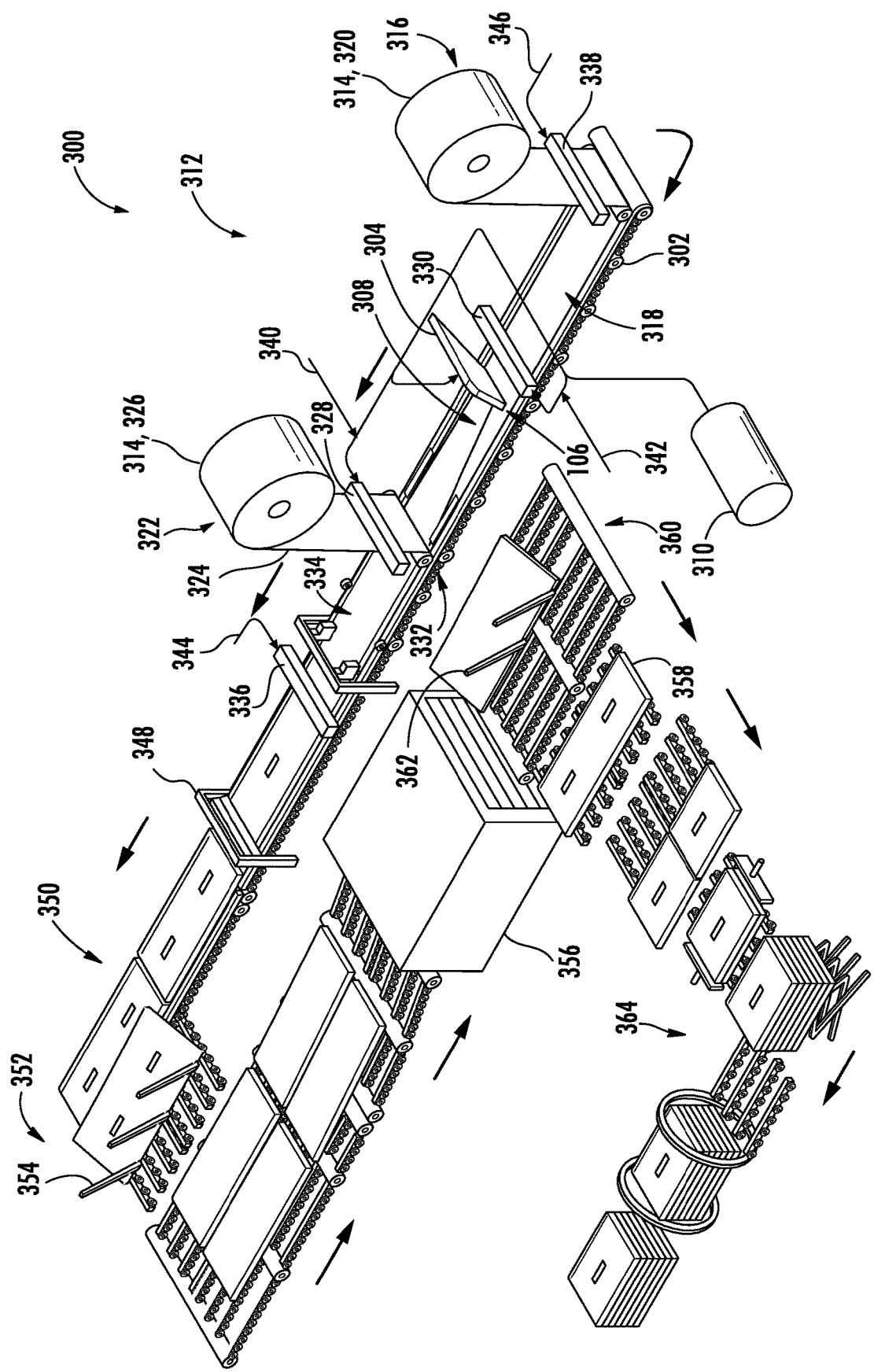
FIG. 3 schematically shows an exemplary system for manufacturing a cementitious panel.

Now referring to FIG. 3, an exemplary system 300 for manufacturing cementitious panels is shown. The exemplary system 300 includes a conveyor assembly 302 such as a continuous belt or fabric, a cementitious core material supply manifold 304 positioned above a surface of the continuous belt or fabric of the conveyor assembly 302. The cementitious core material supply manifold 304 includes an outlet 306 such as a chute or "boot" configured to apply a slurry of cementitious core material 308 so as apply a layer of cementitious core material 308 which will be formed into the core layer 102 of a cementitious panel 100. The slurry of cementitious core material 308 may be provided from a mixing apparatus 310, such as a pin mixer. The slurry of cementitious core material 308 may be provided by mixing dry and wet ingredients in the mixing apparatus 310. The dry ingredients can include, but are not limited to, any combination of cementitious material such as calcium sulfate hemihydrate and known additives, such as fiberglass, accelerator, and in some cases natural or synthetic polymers (e.g., starch). The wet ingredients can be made of many components, including but not limited to, surfactants, dispersants, defoamers, retarders, rheology modifiers, a mixture of water, paper pulp, and other additives, such as potash and natural or synthetic polymer (e.g., starch). The exemplary system 300 further includes a facing material supply assembly 312 configured to supply to the conveyor assembly 302 a plurality of sheets of facing material 104 from a plurality of facing material supply rolls 314. In one embodiment, the plurality of sheets of facing material include an upper sheet and a lower sheet. For purposes of convenience, the lower sheet refers to the sheet of facing material that is closer to the conveyor assembly 302, and the upper sheet refers to the sheet of facing material that is further away from the conveyor assembly. Typically, cementitious panels are formed front-side down, such that the lower sheet corresponds to the front-side of the panel. However, cementitious panels may also be formed back-side down, such that the lower sheet corresponds to the back-side of the panel. The exemplary embodiments that follow describe a system for manufacturing cementitious panels in which the panels are formed front-side down. However, these examples are provided by way of illustration only and should not be interpreted at limiting the present disclosure.

As shown in FIG. 3, a lower facing material supply assembly 316 supplies a lower sheet of facing material 318 to the conveyor assembly 302 from a lower facing material supply roll 320. An upper facing material supply assembly 322 supplies an upper sheet of facing material 324 to the conveyor assembly 302 from an upper facing material supply roll 326. The slurry of cementitious core material 308 flows from the outlet 306 and spreads onto a moving continuous lower sheet of facing material 318, while a moving continuous upper sheet of facing material 314 is applied on the slurry of cementitious material 308. The exemplary system 300 may further include a dense layer applicator assembly configured to apply a dense layer 110 to the upper sheet of facing material 324 and/or to the lower sheet of facing material 318 upstream from the supply manifold 304.

As shown, the system 300 includes an upper dense layer applicator assembly 328 and a lower dense layer applicator assembly 330. The upper dense layer applicator assembly 328 may include for example, a roller assembly and/or a nozzle assembly configured to apply a slurry of cementitious material 308 to the inward side of the upper sheet of facing material 324 in a manner such that the slurry forms a dense layer 110. Similarly, the lower dense layer applicator assembly 330 may include for example, a roller assembly and/or a nozzle assembly configured to apply a slurry of cementitious material 308 to the inward side of the lower sheet of facing material 318 in a manner such that the slurry forms a dense layer 110.

The slurry of cementitious material 308 used to form a dense layer may be of similar composition to that used to form the core layer 102 except that the dense layer typically exhibits a greater concentration of gypsum crystals and a lower concentration of void volumes. This may be accomplished through the manner in which the slurry of cementitious material 308 is applied when forming the dense layer 110. For example, the dense layer applicator assembly may be configured to reduce minimize the introduction of air that may generate foam. Additionally, or in the alternative, the concentration of wet ingredients (e.g., defoamer or dispersant) may be modified to achieve the desired dense layer properties. In some embodiments, the slurry of cementitious material 308 used to form the dense layer may be supplied to the upper and/or lower dense layer applicator assembly 328, 330 from the same mixing apparatus 310 from which cementitious material 308 is supplied to the supply manifold 304. Alternatively, a separate or additional mixing apparatus (not shown) may be utilized to supply cementitious material to the upper and/or lower dense layer applicator assembly 328, 330. For example, a separate or additional mixing apparatus may be utilized when desiring to include different ingredients or different concentrations of ingredients in the dense layer 110.

The exemplary system 300 further includes a forming assembly 332 configured to form a continuous length of cementitious panel material 334 to a desired thickness and width. At the forming assembly, the lower sheet of facing material 318 and/or the upper sheet of facing material 324 may be folded, wrapped, and/or pressed, or the like, so as to surround the slurry of cementitious core material 308. For example, the lower sheet of facing material 318 may wrap around the slurry of cementitious core material 308 and onto the upper sheet of facing material 324. Alternatively, or in addition, the upper sheet of facing material 324 may wrap around the slurry of cementitious core material 308 and onto the lower sheet of facing material 318. An adhesive may be utilized for adhering the upper sheet of facing material and the lower sheet of facing material 318 to one another.

In some embodiments, the exemplary system may include a coater assembly system configured to apply a coating to the upper sheet of facing material 324 and/or to the lower sheet of facing material 318. As shown, the system 300 includes an upper coater assembly 336 and a lower coater assembly 338. The upper coater assembly 336 may include for example, a roller assembly and/or a nozzle assembly configured to apply a coating to the outward side of the upper sheet of facing material 324. Similarly, the lower coater assembly 338 may include for example, a roller assembly and/or a nozzle assembly configured to apply a coating to the outward side of the lower sheet of facing material 318. Such a coating may be applied to the upper or lower sheet of facing material 324, 318 so as to provide a facing material 104 with a plurality of layers. For example, a facing material 104 may include a first layer 116 of facing material 104 applied to a second layer 118 of facing material 104 using a coater assembly 336, 338. The upper coater assembly 336 and/or the lower coater assembly 338 may be located either upstream or downstream from the forming assembly 332. As shown, the upper coater assembly 336 is located downstream from the forming assembly 332 and the lower coater assembly 338 is located upstream from the forming assembly 332. A coater assembly 336, 338 may be desirable for providing coatings with different formulations or properties, such as formulations or properties that may vary as between different grades of cementitious panels 100. Alternatively, or in addition, cementitious panels may be formed using facing material that has already been coated. For example, the facing material supply rolls 314 may supply a facing material that has a plurality of layers, including a coated facing material.

Swellable materials may be included in the core layer 102, the facing material 104, and/or the dense layer 110 of a cementitious panel 100. The swellable material may be supplied from a storage tank (not shown), which may be provided in the form of a permanent tank, a portable tote, or rolling stock equipped with a tank or tote. In some embodiments, swellable material may be introduced into the mixing apparatus 310 as a dry ingredient and/or as a wet ingredient. A slurry of cementitious core material 308 supplied from the mixing apparatus 310 may thereby include a swellable material. A slurry cementitious core material 308 that includes a swellable material may be supplied to the supply manifold 304 so as to form cementitious panels 100 that include swellable material in the core layer 102. Additionally, or in the alternative, a slurry cementitious core material 308 that includes a swellable material may be supplied to the upper dense layer applicator assembly 328 and/or to the lower dense layer applicator assembly 330 so as to form cementitious panels 100 that include swellable material in the dense layer 110.

In some embodiments, a swellable material may be introduced to the upper dense layer applicator assembly 328 and/or to the lower dense layer applicator assembly 330 through a dense layer supply line. As shown, an upper dense layer supply line 340 may supply a swellable material to the upper dense layer applicator assembly 328, and a lower dense layer supply line 342 may supply a swellable material to the lower dense layer applicator assembly 330. The upper dense layer supply line 340 and/or the lower dense layer supply line 342 may be utilized to introduce swellable material to the corresponding dense layer(s) in different quantities than that of the central core layer 103 and/or to introduce swellable material to the dense layer(s) that differ in composition from swellable material introduced into the central core layer 103. For example, in one embodiment, a swellable material may be included in the dense layer(s) without including the swellable material in the central core layer 103. In another embodiment, the dense layer(s) may include a first swellable material and the central core layer 103 may include a second swellable material, in which the first swellable material differs from the second swellable material in respect of concentration and/or composition.

In some embodiments, a swellable material may be introduced to the upper coater assembly 336 and/or to the lower coater assembly 338 through a coater assembly supply line. As shown, an upper coater assembly supply line 344 may supply a swellable material to the upper coater assembly 336, and a lower coater assembly supply line 346 may supply a swellable material to the lower coater assembly 338. In some embodiments, the upper coater assembly 336 may be used to introduce a swellable material to the upper sheet of facing material 324 and/or the lower coater assembly 338 may be used to introduce a swellable material to the lower sheet of facing material 318. Additionally, or in the alternative, cementitious panels may be formed using facing material that already includes swellable material. For example, the facing material supply rolls 314 may supply a facing material that includes a swellable material.

After passing through the forming assembly 332, the continuous length of cementitious panel material 334 is cut with a cutting device 348 such as a saw blade, water knife, or other suitable device to provide a series of sequential cementitious panels 350 of a desired length. Typically, the cutting device 348 will be positioned a sufficient distance downstream from the forming assembly 332 such that the core material has set sufficiently to retain its shape. In some embodiments, vacuum boxes may be positioned along the conveyor assembly 302 to remove excess water.

The cementitious panels 350 continue along the conveyor assembly 302 for some distance, allowing the cementitious core material to further cure. Typically, the cementitious panels 350 are formed front-side down, and after the cementitious panels 350 have sufficiently cured, they are typically turned front-side up at a wet transfer table 352 to protect the front side of the panels from being damaged by the conveyor assembly 302. The wet transfer table 352 may include an articulating lifting and lowering mechanism 354, which has a first set of forks or arms that lift the cementitious panel from its first broad face onto its edge, and a second set of forks or arms that lower the cementitious panel onto its opposite side, bringing the cementitious panel to rest on its second broad face. The cementitious panels 350 are dried in an oven or kiln 356 or other suitable drying apparatus to evaporate excess (free) water while chemically bound water is retained in gypsum crystals formed through the curing process. The cementitious panels 350 are typically dried front-side up, as the wet transfer table 352 with an articulating lifting and lowering mechanism 354 is typically provided to turn the cementitious panel over prior to heating the cementitious panel in the oven or kiln 356. Typically, the cementitious core material 308 partially sets prior to being heated in the oven or kiln 356, and then further at least partially sets during heating in the oven or kiln 356. After exiting the oven or kiln 356, dried cementitious panels 358 are bundled in pairs of two or as needed, with front-sides facing one another, at a dry transfer table 360. The dry transfer table typically includes a similar articulating lifting and lowering mechanism 362, which lifts and lowers a first cementitious panel on top of a second cementitious panel. The dried panels 358 may be further cut to desired sizes and bundled together for transfer to a warehouse or for shipping, using various forms of finishing equipment 364.

Figure 4A:
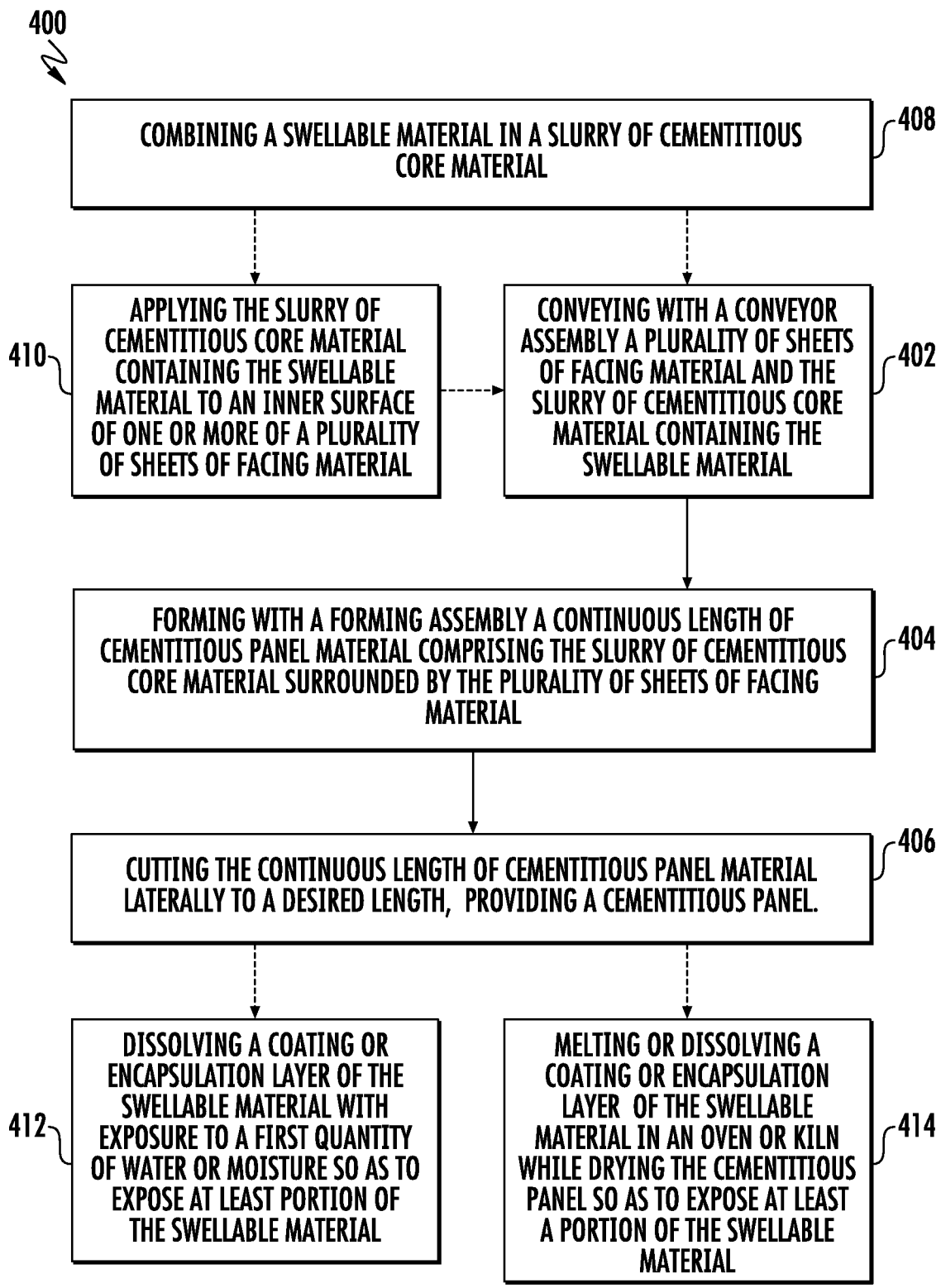
FIGS. 4A and 4B show flowcharts depicting exemplary methods of manufacturing a cementitious panel.

Now turning to FIGS. 4A and 4B, exemplary methods of manufacturing cementitious panels will be discussed. Exemplary methods may be performed using the exemplary system 300 described herein, including any combination or arrangement of various features of such a system. Additionally, exemplary methods may be performed to make any of the cementitious panels described herein, including any combination or arrangement of various features of such panels. As shown in FIG. 4A, in some embodiments, an exemplary method 400 includes conveying with a conveyor assembly, a plurality of sheets of facing material and a slurry of cementitious core material that contains a swellable material 402. The plurality of sheets of facing material include a first sheet of facing material and a second sheet of facing material, with the first sheet of facing material being an upper sheet of facing material and the second sheet of facing material being a lower sheet of facing material. The exemplary method 400 may proceed by forming, with a forming assembly, a continuous length of cementitious panel material comprising the slurry of cementitious core material surrounded by the plurality of sheets of facing material 404, and cutting the continuous length of cementitious panel material laterally to a desired length, providing a cementitious panel 406.

In some embodiments, the exemplary method 400 may optionally include combining a swellable material in a slurry of cementitious core material 408. The slurry of cementitious core material containing the swellable material may be mixed with a mixing apparatus 310, such as a pin mixer. The slurry of cementitious core material containing the swellable material may be supplied to a supply manifold 304, and the supply manifold may apply a layer of cementitious core material 308 to be formed into the core layer 102 of a cementitious panel 100. In some embodiments, the exemplary method 400 may additionally or alternatively include applying the slurry of cementitious core material containing the swellable material to an inner surface of any one or more of a plurality of sheets of facing material 410. The slurry of cementitious core material containing the swellable material may be applied to such inner surface using a dense layer applicator assembly 328, 330 such that the slurry forms a dense layer 110.

Another exemplary method 450 of manufacturing a cementitious panel will be discussed with reference to FIG. 4B. The exemplary method 450 may be performed alone or in combination with the exemplary method 400 of FIG. 4A. Likewise, any one or more steps of the exemplary method 400 of FIG. 4A may be combined with any one or more steps of the exemplary method 450 of FIG. 4B. As shown in FIG. 4B, in some embodiments, an exemplary method 450 includes conveying with a conveyor assembly, a slurry of cementitious core material and a plurality of sheets of facing material in which at least one of the plurality of sheets of facing material include a swellable material 452. The plurality of sheets of facing material may include a first sheet of facing material and a second sheet of facing material, with the first sheet of facing material being an upper sheet of facing material and the second sheet of facing material being a lower sheet of facing material. The exemplary method 450 may proceed by forming, with a forming assembly, a continuous length of cementitious panel material comprising the slurry of cementitious core material surrounded by the plurality of sheets of facing material 454, and cutting the continuous length of cementitious panel material laterally to a desired length, providing a cementitious panel 456.

In some embodiments, the exemplary method 450 may optionally include combining a swellable material in a slurry of cementitious core material 458. The slurry of cementitious core material containing the swellable material may be mixed with a mixing apparatus 310, such as a pin mixer. The slurry of cementitious core material containing the swellable material may be supplied to a supply manifold 304, and the supply manifold may apply a layer of cementitious core material 308 to be formed into the core layer 102 of a cementitious panel 100. In some embodiments, the exemplary method 450 may additionally or alternatively include applying a coating to one or more of a plurality of sheets of facing material, in which the coating includes a swellable material 460. The coating may be applied to an inner surface or an outer surface of a sheet of facing material. In some embodiments, the coating may be applied using a coater assembly, such as an upper coater assembly 336 and/or a lower coater assembly 338. The coating may provide a facing material 104 with a plurality of layers such as a first layer 116 of facing material 104 that includes a swellable material applied to a second layer 118 of facing material 104. Alternatively, or in addition, an exemplary method 450 may utilize a facing material that has already been coated and/or that already includes a swellable material.

Figure 4B:
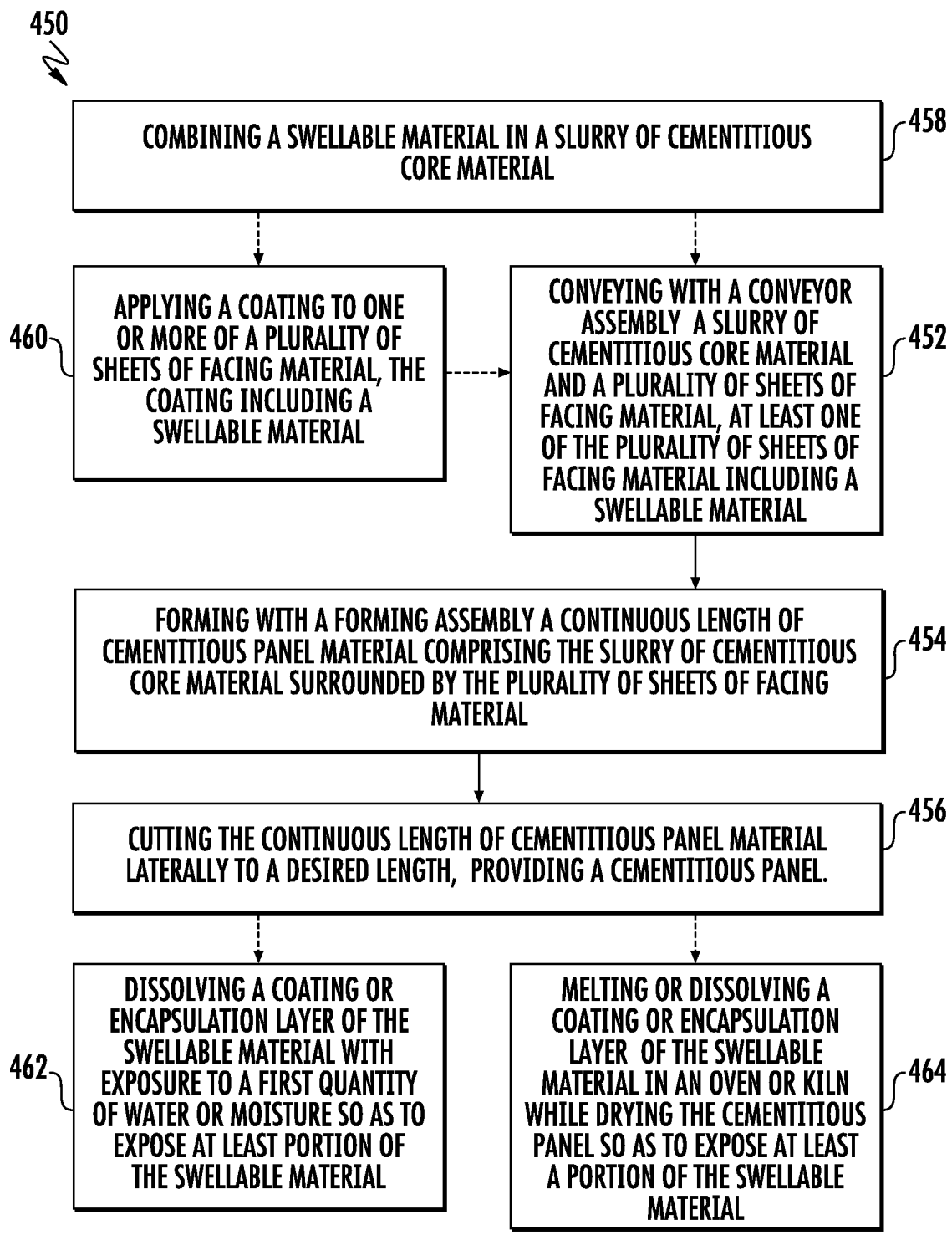

Referring to both FIGS. 4A and 4B, in some embodiments, the swellable material may include an encapsulation or coating configured to prevent or delay the water-swellable properties of the swellable material until a future period or point in time. An exemplary method 400, 450 may include dissolving a coating or encapsulation layer of the swellable material with exposure to a first quantity of water or moisture so as to expose at least a portion of the swellable material 412, 462. Additionally, or in the alternative, an exemplary method 400, 450 may include melting or dissolving a coating or encapsulation layer of the swellable material in an oven or kiln while drying the cementitious panel so as to expose at least a portion of the swellable material 414, 462.

Figure 5:
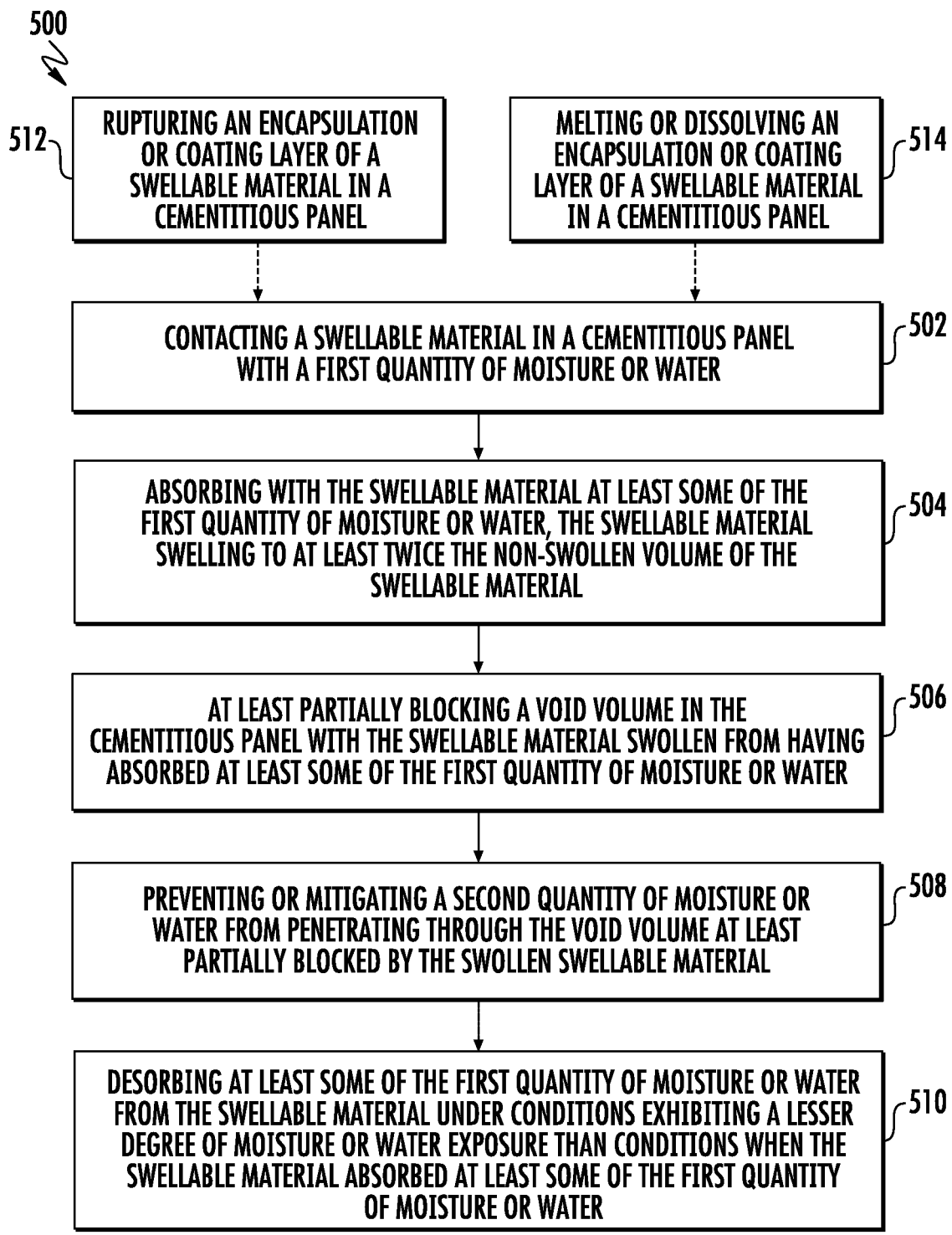
FIG. 5 shows a flowchart depicting an exemplary method of providing a moisture or water barrier in a cementitious panel.

Now turning to FIG. 5, exemplary methods of providing a moisture or water barrier in a cementitious panel will be discussed. An exemplary method 500 includes contacting a swellable material in a cementitious panel with a first quantity of moisture or water 502, and absorbing with the swellable material at least some of the first quantity of moisture or water with the swellable material swelling to at least twice the non-swollen volume of the swellable material 504. The moisture or water may come into contact with the swellable material through void volumes in the cementitious panel (e.g., pores in the facing material), and/or through holes, punctures, cracks, cuts, perforations, or the like which may arise from damage to a cementitious panel as well as from ordinary installation, use, or wear. For example, water or moisture may penetrate through holes, punctures, cracks, cuts, perforations, or the like caused by fasteners, thereby coming into contact with the swellable material.

The exemplary method 500 continues with at least partially blocking a void volume in the cementitious panel with the swellable material swollen from having absorbed at least some of the first quantity of water 506, and preventing or mitigating a second quantity of moisture of water from penetrating through the void volume at least partially blocked by the swollen swellable material 508. The void volume may include a porous structure of the cementitious panel, and/or such holes, punctures, cracks, cuts, perforations, or the like through which the water or moisture was absorbed or which may be located near the swollen swellable material. In some embodiments, the void volume may include a fastener hole. In some embodiments, the exemplary method 500 may include desorbing at least some of the first quantity of moisture from the swellable material under conditions exhibiting a lesser degree of moisture of water exposure than conditions when the swellable material absorbed at least some of the first quantity of moisture 510.

In some embodiments, the swellable material may include an encapsulation or coating configured to prevent or delay the water-swellable properties of the swellable material until a future period or point in time. An exemplary method 500 may include rupturing an encapsulation or coating layer of a swellable material in a cementitious panel 512. For example, an encapsulation or coating layer may be ruptured by fasteners such as nails or screws penetrating the cementitious panel when hanging the cementitious panel in place. Additionally, or alternatively, an encapsulation or coating layer may be ruptured by other objects that may cause such punctures, cracks, cuts, perforations, or the like. In another embodiment, an exemplary method 500 may additionally or alternatively include melting or dissolving a coating or encapsulation layer of the swellable material 514. For example, the coating or encapsulation layer may be dissolved with exposure to a first quantity of water or moisture so as to expose at least a portion of the swellable material 412, 462. Additionally, or in the alternative, the coating or encapsulation layer of the swellable material may be melted or dissolved in an oven or kiln while drying the cementitious panel so as to expose at least a portion of the swellable material 414, 462.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gypsum panel, comprising:
a core layer comprising gypsum;
a plurality of sheets of facing material surrounding the core layer, the plurality of sheets of facing material comprising a first sheet of facing material and a second sheet of facing material;
a first dense layer comprising gypsum defining an interface between the core layer and the first sheet of facing material, and optionally, a second dense layer comprising gypsum defining an interface between the core layer and the second sheet of facing material; and
one or more swellable materials, wherein the first dense layer or both the first dense layer and the second dense layer comprise at least one of the one or more swellable materials, the one or more swellable materials comprising from 0.1 wt. % to 40 wt. % based on the total weight of the first dense layer or both the first dense layer and the second dense layer, wherein the one or more swellable materials comprises an encapsulated or coated swellable material.

2. The gypsum panel of claim 1, wherein the core layer further comprises at least one of the one or more swellable materials, the one or more swellable materials of the core layer comprising from 0.1 wt. % to 90 wt. % of the core layer, based on the total weight of the core layer.

3. The gypsum panel of claim 1, wherein the first dense layer or both the first dense layer and the second dense layer comprise at least one of the one or more swellable materials, the one or more swellable materials comprising from 0.1 wt. % to 20 wt. % based on the total weight of the first dense layer or both the first dense layer and the second dense layer.

4. The gypsum panel of claim 1, wherein the one or more swellable materials comprises particles and/or discrete domains of a micro-scale size, the particles and/or discrete domains having an average cross-sectional dimension from 1 μm to 2000 μm.

5. The gypsum panel of claim 1, wherein the one or more swellable materials comprises particles and/or discrete domains of a nano-scale size, the particles and/or discrete domains having an average cross-sectional dimension from 1 nm to 1,000 nm.

6. The gypsum panel of claim 1, wherein the one or more swellable materials has the capability to swell to a volume that is from 2 to 100 times the non-swollen volume of the swellable material.

7. The gypsum panel of claim 1, wherein the one or more swellable materials has the capability to absorb from 2 to 30 times its weight in distilled water.

8. The gypsum panel of claim 1, wherein the one or more swellable materials comprises one or more phyllosilicates.

9. The gypsum panel of claim 1, wherein the one or more swellable materials comprises nanocrystalline or microcrystalline cellulose, methyl cellulose, carboxymethyl cellulose, hydroxypropylcellulose, and/or hydroxypropylmethylcellulose.

10. The gypsum panel of claim 1, wherein the one or more swellable materials comprises nanocrystalline or microcrystalline cellulose, the nanocrystalline or microcrystalline cellulose comprising ultrafine cellulose, colloidal cellulose, and/or nanocrystalline or microcrystalline cellulose gel.

11. The gypsum panel of claim 1, wherein the one or more swellable materials comprises a superabsorbent polymer.

12. The gypsum panel of claim 11, wherein the superabsorbent polymer comprises an ethylenically unsaturated carboxylic acid or carboxylic acid anhydride monomeric compound, and/or an ethylenically unsaturated sulfonic acid monomeric compound.

13. The gypsum panel of claim 1, wherein the gypsum panel exhibits a surface water resistance according to ASTM C-473 such that the panel absorbs less than 10% of water.

14. The gypsum panel of claim 1, wherein the gypsum panel further comprises void volumes in the form of one or more holes, punctures, cracks, cuts, or perforations, at least some of the void volume capable of being at least partially blocked by the swellable material once swollen by absorbing water or moisture, wherein the holes optionally include fastener holes.

15. The gypsum panel of claim 1, wherein the one or more swellable materials comprises a clay.

16. The gypsum panel of claim 1, wherein the one or more swellable materials comprises a phyllosilicate.

17. The gypsum panel of claim 16, wherein the phyllosilicate comprises montmorillonite.

18. The gypsum panel of claim 1, wherein the core layer consists of gypsum, one or more swellable materials, and optionally, filler materials, additives, and/or hydraulically setting materials.

19. A gypsum panel, comprising:
a core layer comprising gypsum;
a plurality of sheets of facing material surrounding the core layer, the plurality of sheets of facing material comprising a first sheet of facing material and a second sheet of facing material;
a first dense layer comprising gypsum defining an interface between the core layer and the first sheet of facing material, and optionally, a second dense layer comprising gypsum defining an interface between the core layer and the second sheet of facing material; and
one or more swellable materials, wherein the first dense layer or both the first dense layer and the second dense layer comprise at least one of the one or more swellable materials, the one or more swellable materials comprising from 0.1 wt. % to 40 wt. % based on the total weight of the first dense layer or both the first dense layer and the second dense layer, wherein the one or more swellable materials comprises particles and/or discrete domains of a nano-scale size, the particles and/or discrete domains having an average cross-sectional dimension from 1 nm to 1,000 nm.

20. A method of providing a moisture or water barrier in a gypsum panel, the method comprising:
contacting a swellable material in a gypsum panel with a first quantity of moisture or water, the gypsum panel comprising:
a core layer comprising gypsum;
a plurality of sheets of facing material surrounding the core layer, the plurality of sheets of facing material comprising a first sheet of facing material and a second sheet of facing material; and
a first dense layer comprising gypsum defining an interface between the core layer and the first sheet of facing material, and optionally, a second dense layer comprising gypsum defining an interface between the core layer and the second sheet of facing material;
wherein the first dense layer or both the first dense layer and the second dense layer comprise the swellable material, the swellable material comprising from 0.1 wt. % to 40 wt. % based on the total weight of the first dense layer or both the first dense layer and the second dense layer, wherein the one or more swellable materials comprises an encapsulated or coated swellable material;

absorbing with the swellable material at least some of the first quantity of moisture or water with the swellable material swelling to at least twice the non-swollen volume of the swellable material;

at least partially blocking a void volume in the gypsum panel with the swellable material swollen from having absorbed at least some of the first quantity of water; and preventing or mitigating a second quantity of moisture of water from penetrating through the void volume at least partially blocked by the swollen swellable material.

21. The method of claim 20, wherein the void volume comprises one or more holes, punctures, cracks, cuts, or perforations.

22. The method of claim 20, wherein the void volume comprises one or more fastener holes.

* * * * *